US010331567B1

United States Patent
Meier et al.

(10) Patent No.: US 10,331,567 B1
(45) Date of Patent: Jun. 25, 2019

(54) PREFETCH CIRCUIT WITH GLOBAL QUALITY FACTOR TO REDUCE AGGRESSIVENESS IN LOW POWER MODES

(71) Applicant: Apple Inc., Cupertino, CA (US)

(72) Inventors: Stephan G. Meier, Los Altos, CA (US); Tyler J. Huberty, Sunnyvale, CA (US); Nikhil Gupta, Santa Clara, CA (US); Francesco Spadini, Sunset Valley, TX (US); Gideon Levinsky, Cedar Park, TX (US)

(73) Assignee: Apple Inc., Cupertino, CA (US)

( * ) Notice: Subject to any disclaimer, the term of this patent is extended or adjusted under 35 U.S.C. 154(b) by 121 days.

(21) Appl. No.: 15/435,910

(22) Filed: Feb. 17, 2017

(51) Int. Cl.
  G06F 12/08   (2016.01)
  G06F 12/0862 (2016.01)
  G06F 12/12   (2016.01)

(52) U.S. Cl.
  CPC ......... *G06F 12/0862* (2013.01); *G06F 12/12* (2013.01); *G06F 2212/1024* (2013.01); *G06F 2212/602* (2013.01)

(58) Field of Classification Search
  CPC ......... G06F 12/0862; G06F 2212/1024; G06F 2212/602; G06F 12/12; G06F 12/128
  See application file for complete search history.

(56) References Cited

U.S. PATENT DOCUMENTS

| | | |
|---|---|---|
| 5,305,389 A | 4/1994 | Palmer |
| 6,151,662 A | 11/2000 | Christie et al. |

(Continued)

FOREIGN PATENT DOCUMENTS

| | | |
|---|---|---|
| EP | 0402787 A2 | 12/1990 |
| TW | 486628 B | 5/2002 |

(Continued)

OTHER PUBLICATIONS

Jia et al, "An Improved AMPM-based Prefetcher Coupled with Configurable Cache Line Sizing," 2015, accessed (in Jul. 2018) from http://comparch-conf.gatech.edu/dpc2/resource/dpc2_jia.pdf, 4 pages.*

(Continued)

*Primary Examiner* — Glenn Gossage
(74) *Attorney, Agent, or Firm* — Meyertons, Hood, Kivlin, Kowert & Goetzel, P.C.; Lawrence J. Merkel

(57) ABSTRACT

A prefetch circuit may include a memory, each entry of which may store an address and other prefetch data used to generate prefetch requests. For each entry, there may be at least one "quality factor" (QF) that may control prefetch request generation for that entry. A global quality factor (GQF) may control generation of prefetch requests across the plurality of entries. The prefetch circuit may include one or more additional prefetch mechanisms. For example, a stride-based prefetch circuit may be included that may generate prefetch requests for strided access patterns having strides larger than a certain stride size. Another example is a spatial memory streaming (SMS)-based mechanism in which prefetch data from multiple evictions from the memory in the prefetch circuit is captured and used for SMS prefetching based on how well the prefetch data appears to match a spatial memory streaming pattern.

18 Claims, 12 Drawing Sheets

(56) References Cited

U.S. PATENT DOCUMENTS

| | | | |
|---|---|---|---|
| 6,317,811 B1* | 11/2001 | Deshpande | G06F 9/345 |
| | | | 711/137 |
| 6,446,167 B1 | 9/2002 | Mayfield et al. | |
| 6,970,985 B2 | 11/2005 | Moritz | |
| 7,165,146 B2 | 1/2007 | Walin | |
| 7,493,607 B2 | 2/2009 | Moritz | |
| 7,836,259 B1 | 11/2010 | Filippo et al. | |
| 7,975,108 B1 | 7/2011 | Holscher et al. | |
| 8,255,631 B2 | 8/2012 | Chen et al. | |
| 8,627,009 B2 | 1/2014 | Mekhiel | |
| 8,856,447 B2 | 10/2014 | Williams, III | |
| 8,856,451 B2* | 10/2014 | Thompson | G06F 12/0862 |
| | | | 711/137 |
| 8,892,822 B2 | 11/2014 | Chou | |
| 8,924,651 B2 | 12/2014 | Tang et al. | |
| 9,015,422 B2 | 4/2015 | Meier et al. | |
| 9,886,385 B1* | 2/2018 | Huberty | G06F 12/0862 |
| 9,904,624 B1* | 2/2018 | Huberty | G06F 12/0862 |
| 9,971,694 B1 | 5/2018 | Meier et al. | |
| 2002/0069326 A1 | 6/2002 | Richardson et al. | |
| 2002/0087802 A1 | 7/2002 | Al-Dajani et al. | |
| 2003/0079089 A1 | 4/2003 | Barrick et al. | |
| 2007/0088915 A1 | 4/2007 | Archambault et al. | |
| 2007/0088919 A1 | 4/2007 | Shen | |
| 2007/0288697 A1 | 12/2007 | Keltcher | |
| 2008/0016330 A1 | 1/2008 | El-Essawy et al. | |
| 2008/0155196 A1 | 6/2008 | Black | |
| 2009/0199190 A1 | 8/2009 | Chen et al. | |
| 2009/0217004 A1 | 8/2009 | Van De Waerdt | |
| 2009/0307691 A1 | 12/2009 | Moscibroda et al. | |
| 2010/0268892 A1 | 10/2010 | Luttrell | |
| 2011/0066811 A1 | 3/2011 | Sander et al. | |
| 2012/0159073 A1 | 6/2012 | Jaleel et al. | |
| 2013/0238861 A1 | 9/2013 | Manne et al. | |
| 2013/0254485 A1 | 9/2013 | Kannan et al. | |
| 2013/0346703 A1 | 12/2013 | McCauley | |
| 2014/0108740 A1 | 4/2014 | Rafacz et al. | |
| 2014/0258641 A1 | 9/2014 | Hooker | |
| 2016/0062768 A1 | 3/2016 | Jagannathan et al. | |
| 2017/0371790 A1* | 12/2017 | Dwiel | G06F 12/0811 |

FOREIGN PATENT DOCUMENTS

| | | | |
|---|---|---|---|
| TW | 200821925 A | 5/2008 | |
| TW | 200901027 A | 1/2009 | |

OTHER PUBLICATIONS

Mansi, "An Improved Hybrid AMPM and ISB Prefetcher," 2016, place of publication unknown, pp. 1-8.*

Dimitrov et al, "Combining Local and Global History for High Performance Data Prefetching," Journal of Instruction-Level Parallelism 13 (2011), pp. 1-14.*

Nesbit et al, "Data Cache Prefetching Using a Global History Buffer," published in 10th International Symposium on High Performance Computer Architecture (HPCA '04), Feb. 14-18, 2004, 10 pages.*

Michael Ferdman, et al.; "Spatial Memory Streaming with Rotated Patterns," Computer Architecture Laboratory (CALCM) Carnegie Mellon University, Parallel Systems Architecture Lab (PARSA) Ecole Polytechnique Federale de Lausanne, http://www.ece.cmu.deu/~stems, 2009, 5 pages.

Stephen Somogyi et al.; "Spatial Memory Streaming," Computer Architecture Laboratory (CALCM) Carnegie Mellon University, Dept. of Electrical & Computer Engineering University of Torronto, Proccedings of the 33rd International Symposium on Computer Architecture (ISCA '06), 2006, The Computer Society, http://www.ece.cmu.edu/~stems, 12 pages.

Stephen Somogyi et al.; "Spatio-Temporal Memory Streaming," Caregie Mellon University, University of Michigan, Ecole Polytechnique Federale de Lausanne, http://www.ece.cmu.edu/~stems, ISCA '09, Jun. 20-24, 2009, Austin, Texas, USA. 12 pages.

Yasuo Ishii et al., "Access Map Pattern Matching Prefetch: Optimization Friendly Method," NEC Corporation, University of Tokyo, 2009. pp. 1-5.

Yasuo Ishii et al., "Access Map Pattern Matching for High Performance Data Cache Prefetch," NEC Corporation, The University of Tokyo, Japan, Journal of Instruction-Level Parallelism 13 (2011), submitted Mar. 2010; published Jan. 2011 pp. 1-24.

U.S. Appl. No. 14/748,833, filed Jun. 24, 2015, Stephan G. Meier et al., 45 pages.

Zhigang Hu, Margaret Martonosi, and Stefanos Kaxiras "TCP: Tag Correlating Prefetchers", Feb. 2003, Proceedings of the 9th International Symposium on High-Performance Computer Architecture (HPCA '03), pp. 1-10.

Fei Gao, Hanyu Cui, Suleyman Sair "Two-level Data Prefetching" 25th International Conference on Computer Design, 2007, pp. 1-8.

Harold W. Cain, Priya Nagpurkar, "Runahead Execution vs. Conventional Data Prefetching in the IBM POWER6 Microprocessor" International symposium on performance analysis of systems and software, 2010, pp. 1-10.

U.S. Appl. No. 15/093,173, filed Apr. 7, 2016, Huberty et al.

U.S. Appl. No. 15/093,213, filed Apr. 7, 2016, Meier et al.

U.S. Appl. No. 15/948,072, Stephan G. Meier, filed Apr. 9, 2018.

* cited by examiner

```
                    AP
          A  A | A | P  P           Unit Stride, Forward
       A  .  A  . | A | .  P  .  P  Non-unit, Regular Stride, Forward
49 ──     P  P | A | A  A           Unit Stride, Backward
       A  *  *  * | A | P           Wildcards
A  A  .  .  A  . | A | P  P  .  P  P  Irregular Pattern, Forward
A  .  A  A  A  . | A | .  P  P      Irregular Pattern, Forward
       A  A  A  A  A | A | P  P  P  L  L  Unit Stride with Next Level
                   | A | L  L  L  L  L  Density Pattern
         47 ──    | A | P  P  N  N  P  Pattern with Anti-Prefetch
                       43 ──/
```

Fig. 4

```
                 AP
       A  .  .  * | A | P    Wildcard Pattern
       A  .  .  A | A |      Matching Access Map 1
       A  .  .  S | A |      Matching Access Map 2
       A  .  .  P | A |      Matching Access Map 3
       A  .  .  L | A |      Matching Access Map 4
       A  .  .  N | A |      Matching Access Map 5
       A  .  .  . | A |      Matching Access Map 6
```

Fig. 5

| State | AQF | BQF | GQF |
|---|---|---|---|
| Initial Map Allocation | + | 0 | 0 |
| Data Cache Load Prefetch | - | 0 | - |
| Data Cache Store Prefetch | - | 0 | - |
| Data Cache Prefetch Consumed by Demand | + | 0 | 0 |
| Pending Prefetch Consumed by Demand | + | 0 | 0 |
| Prefetch Hit in Data Cache | - | 0 | 0 |
| Prefetch Initial Miss in External Cache | 0 | + | 0 |
| Prefetch Subsequent Miss in External Cache | 0 | + | 0 |
| External Cache Load Prefetch | - | - | 0 |
| External Cache Store Prefetch | - | - | 0 |
| External Cache Prefetch Consumed by Demand | + | 0 | + |
| External Cache Prefetch Consumed by Data Cache Prefetch | + | 0 | 0 |
| External Cache Pending Prefetch Consumed by Demand | + | 0 | 0 |

Fig. 9

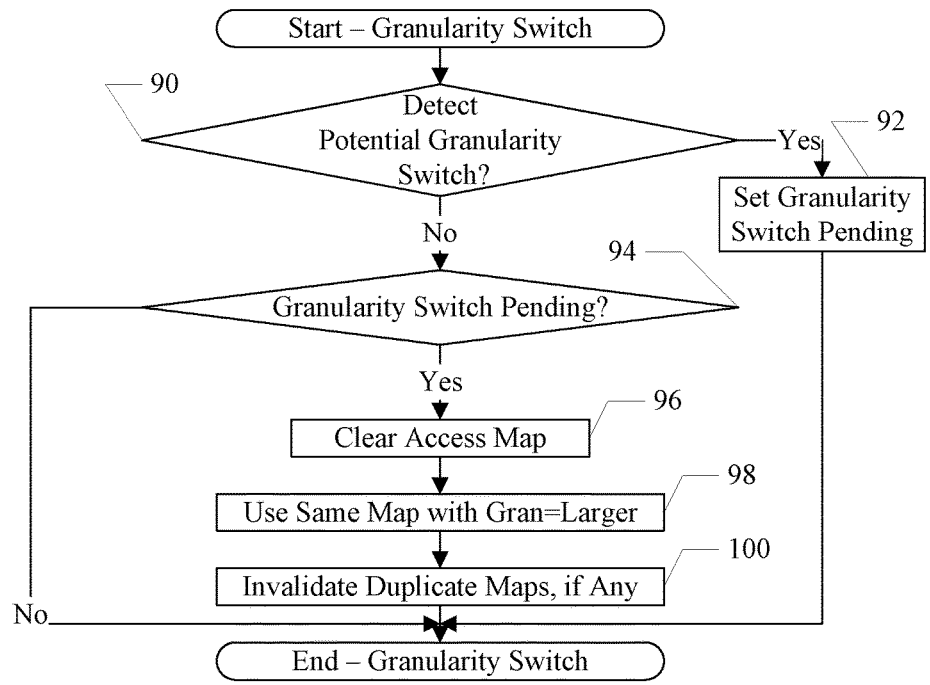

Fig. 10

PREFETCH CIRCUIT WITH GLOBAL QUALITY FACTOR TO REDUCE AGGRESSIVENESS IN LOW POWER MODES

BACKGROUND

Technical Field

Embodiments disclosed herein are related to prefetch mechanisms in processors.

Description of the Related Art

Processors continue to be produced with both higher operating frequencies and higher average numbers of instructions executed per clock cycle (IPC). Memory latency, on the other hand, has decreased at a much slower rate. As a result, processors are often stalled awaiting instructions and/or data from memory. In order to improve performance, processors typically include one or more levels of caching. Data stored in the cache may be available at a much lower latency than data from memory. Thus, cache hits may be provided with low latency and may improve performance of the processors. Cache misses are fetched from memory and incur the higher memory latencies.

In an attempt to reduce the effective memory latency even further, processors can implement prefetching. Generally, prefetching involves predicting which cache blocks the processor will need to access soon, and initiating the memory read for the cache blocks prior to such accesses being generated via instruction code execution in the processor. If the prefetching successfully reads cache blocks that are later accessed by the processor, memory latency is reduced because the accesses are cache hits instead of cache misses. On the other hand, inaccurate prefetching can cause useful data to be removed from the cache and the inaccurately prefetched data is not accessed, which reduces performance. Additionally, even if performance is not adversely affected or improved by a small amount, excess power consumed by the processor to perform the prefetching might not be justified. Particularly, in portable devices in which the available energy is limited (e.g. from a battery), the excess power consumption can reduce battery life. Balancing the amount of prefetching to be performed and the effectiveness of the prefetching is a challenge.

SUMMARY

In an embodiment, a processor may include a prefetch circuit. The prefetch circuit may include a memory, each entry of which may be configured to store an address and other prefetch data used to generate prefetch requests. For each entry, there may be at least one value (referred to as a quality factor herein) that may control prefetch request generation for that entry based on effectiveness/accuracy of the prefetches generated from that entry. Additionally, there may be a second value (referred to as a global quality factor herein) that may control generation of prefetch requests across the plurality of entries. The global quality factor may help to ensure that the overall number of prefetch requests is limited at times when there are many prefetches outstanding. For example, when the global quality factor is low, fewer prefetch requests may be generated.

In an embodiment, the prefetch circuit may include one or more additional prefetch mechanisms. For example, a stride-based prefetch circuit may be included which may learn strides for demand accesses that miss in the prefetch circuit memory. The primary prefetch mechanism may efficiently prefetch strided access patterns that have a stride smaller than a certain stride size. The stride-based prefetch circuit may be configured to generate prefetch requests for strided access patterns having strides larger than that stride size. Another example is a spatial memory streaming (SMS)-based mechanism. In an embodiment, the SMS-based mechanism may capture prefetch data evicted from the prefetch memory, and may merge data from multiple evictions corresponding to a given program counter (PC) of an initial instruction that touched the entry. The merging may be based on how well the prefetch data appears to match a spatial memory streaming pattern, for example.

BRIEF DESCRIPTION OF THE DRAWINGS

The following detailed description makes reference to the accompanying drawings, which are now briefly described.

FIG. 4 is a diagram illustrating exemplary patterns to be matched.

FIG. 5 is a diagram illustrating a pattern including a wild card and the matching patterns.

FIG. 9 is a table illustrating one embodiment of quality factor updates.

FIG. 10 is a flowchart illustrating operation of one embodiment of the prefetch circuit shown in FIG. 3 for changing a granularity of the prefetch.

Figure 1:
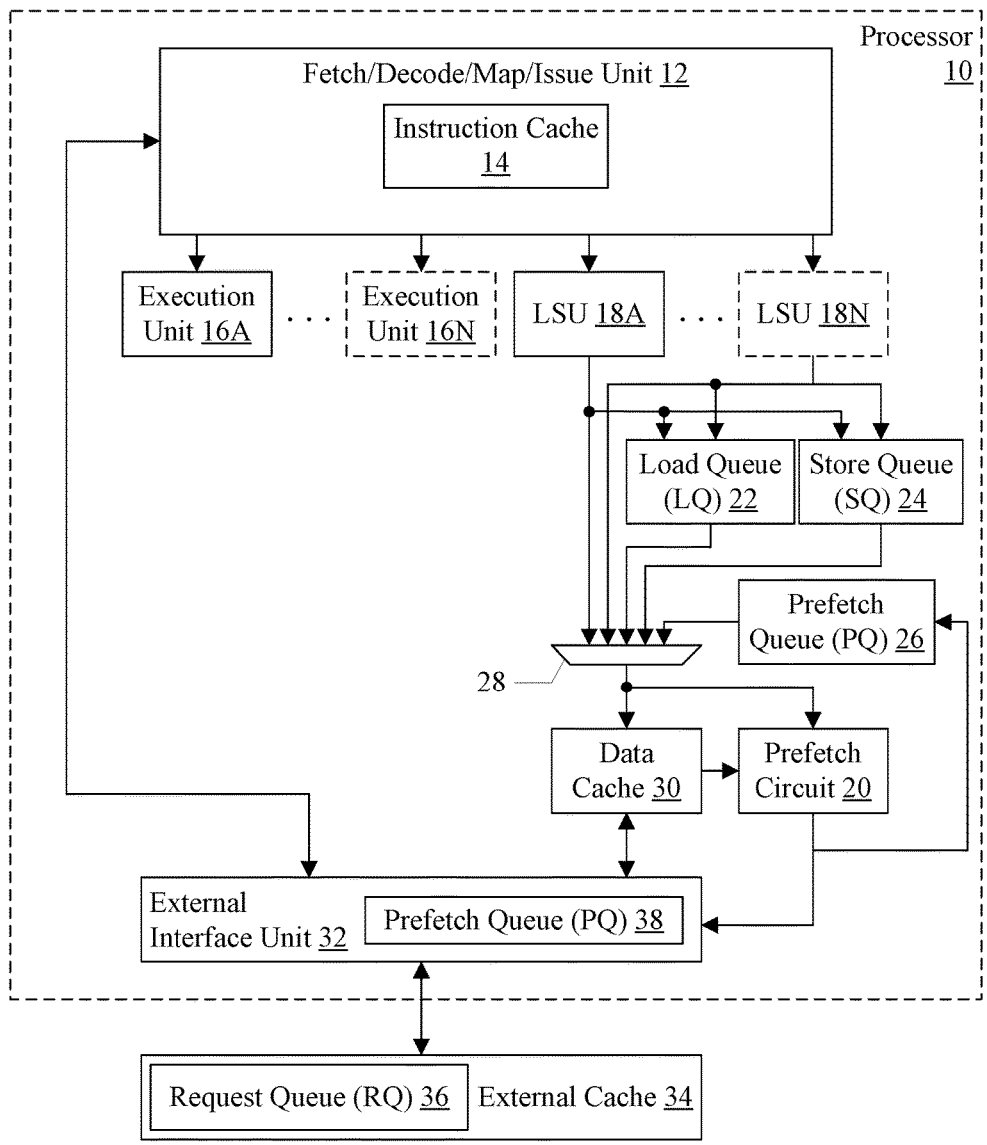
FIG. 1 is a block diagram of one embodiment of a portion of a system including a processor and an external cache.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be said to be "configured" to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Processor Overview

Turning now to FIG. 1, a block diagram of one embodiment of a portion of a system including a processor 10 and an external (to the processor 10) cache 34 is shown. In the embodiment of FIG. 1, the processor 10 may include a fetch/decode/map/issue (FDMI) unit 12 that may include an instruction cache 14. The processor 10 may further include one or more execution units 16A-16N, one or more load/store units (LSUs) 18A-18N, a prefetch circuit 20, a load queue (LQ) 22, a store queue (SQ) 24, a prefetch queue (PQ) 26, a multiplexor (mux) 28, a data cache 30, and an external interface unit 32. The external interface unit 32 may also include a prefetch queue 38. The data cache 30 and the FDMI unit 12 are coupled to the external interface unit 32, which is coupled to communicate external to the processor 10 (e.g. to the external cache 34 and/or to other components of a system including the processor 10). The FDMI unit 12 is coupled to the execution units 16A-16N and the LSUs 18A-18N. The LSUs 18A-18N are coupled to the load queue 22 and the store queue 24, and the prefetch circuit 20 is coupled to the data cache 30 and the prefetch queue 26. The LSUs 18A-18N, the load queue 22, the store queue 24, and the prefetch queue 26 are coupled to the mux 28, which is coupled to the data cache 30 and the prefetch circuit 20.

The FDMI unit 12 may be configured to fetch instructions for execution by the processor 10, decode the instructions into ops for execution, map the ops to speculative resources (e.g. rename registers) to permit out-of-order and/or speculative execution, and issue the ops for execution to the execution units 16A-16N and/or LSUs 18A-18N. More particularly, the FDMI unit 12 may be configured to cache instructions previously fetched from memory (through the external interface unit 32) in the instruction cache 14, and may be configured to fetch a speculative path of instructions for the processor 10. The FDMI unit 12 may implement various prediction structures to predict the fetch path. For example, a next fetch predictor may be used to predict fetch addresses based on previously executed instructions. Branch predictors of various types may be used to verify the next fetch prediction, or may be used to predict next fetch addresses if the next fetch predictor is not used. The FDMI unit 12 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 10 may be decoded into a single instruction operation, and thus the instruction operation may be essentially synonymous with instruction (although it may be modified in form by the decoder). The term "instruction operation" may be more briefly referred to herein as "op." The ops may be mapped to physical registers from the architectural registers used in the instructions, and then scheduled for issue. The scheduling may be centralized in a scheduler, or decentralized in reservation stations, in various embodiments, based on the availability of operands for each op. A register file or files (not shown in FIG. 1) may implement the physical registers of the processor 10. There may be separate physical registers for different operand types (e.g. integer, media, floating point, etc.) in an embodiment. In other embodiments, the physical registers may be shared over operand types.

The execution units 16A-16N may include any types of execution units in various embodiments. For example the execution units 16A-16N may include integer, floating point, and/or media (vector) execution units. Integer execution units may be configured to execute integer ops. Generally, an integer op is an op which performs a defined operation (e.g. arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

Media execution units may be configured to execute media ops. Media ops may be ops that have been defined to process media data (e.g. image data such as pixels, audio data, etc.). Media processing may be characterized by performing the same processing on significant amounts of data, where each datum is a relatively small value (e.g. 8 bits, or 16 bits, compared to 32 bits to 64 bits for an integer). Thus, media ops often include single instruction-multiple data (SIMD) or vector operations on an operand that represents multiple media data. Media ops/execution units may more generally be vector ops/execution units.

Thus, each execution unit may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops.

The LSUs 18A-18N may be configured to execute load/store memory ops. Generically, a memory operation (memory op) may be an instruction operation that specifies an access to memory (although the memory access may be completed in a cache such as the data cache 30 or the external cache 34). Generally, a load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. The LSUs 18A-18N may be configured to perform virtual address generation from various address operands of the load/store ops and may be configured to transmit the ops to the data cache 30 (through the mux 28) and to the load queue 22/store queue 24.

The load queue 22 may be configured to queue load ops that have been executed by the LSUs 18A-18N. The load ops may be queued awaiting cache fills if they miss in the data cache 30 (and/or TLB miss translation fills if translation is enabled). The load ops may be queued for ordering reasons as well. Similarly, the store queue 24 may be configured to queue store ops that have been executed by the LSUs 18A-18N. The store ops may be queue for cache/TLB fills, to await store data from the data source operand, and/or to await non-speculative/retired state to update the data cache 30 and/or memory. In other embodiments, a combined load/store queue may be used.

The prefetch queue 26 may store prefetch requests generated by the prefetch circuit 20 to access the data cache 30. The prefetch requests may be generated by the prefetch circuit 20 observing the load/store ops executed by the LSUs 18A-18N. Thus, the prefetch requests may be predicted read requests generated prior to the instruction code being executed by the processor 10 actually requesting the data. Viewed in another way, a prefetch request may be generated as a prediction that one or more subsequently-executed ops will access the prefetched data. In contrast, cache requests by load/store ops may be referred to as demand fetches, because they are directly specified by the execution of code, rather than predicted. The prefetch requests are thus speculative, and may later be found to be incorrect if the demand fetches do not subsequently access the prefetched data.

In an embodiment, the prefetch circuit 20 may be an implementation of an access map/pattern match (AMPM) prefetcher with various enhancements. The AMPM prefetcher is described in more detail below. The prefetch circuit 20 may monitor the demand fetches/prefetch requests selected through the mux 28 to access the data cache 30, along with cache hit/miss status from the data cache 30, to generate prefetch requests. In an embodiment, the AMPM prefetcher may be a primary prefetch circuit supported by one or more secondary prefetch circuits as described in more detail below. Furthermore, other embodiments may implement other prefetch mechanisms as the primary prefetch circuit.

The data cache 30 may have any capacity and configuration. For example, set associative, fully associative, and direct mapped configurations may be used in various embodiments. The data cache 30 may be configured to cache data in cache blocks, where a cache block is a set of bytes from contiguous memory locations that are allocated and deallocated space in the cache as a unit. The cache blocks may be aligned to a cache block boundary (e.g. a 32 byte cache block may be aligned to a 32 byte boundary, a 64 byte cache block may be aligned to a 64 byte boundary, a 128 byte cache block may be aligned to a 128 byte boundary, etc.). Thus, the address of a byte may be divided into a cache offset portion (the least N significant bits of the address, where $2^N$ is the size of the cache block) and a cache tag portion (the remaining address bits). In an embodiment, the data cache 30 may be virtually indexed and a translation lookaside buffer (TLB, not shown in FIG. 1) may be accessed in parallel to translate the virtual address to a physical address of a memory location in the memory.

Cache misses in data cache 30 and instruction cache 14, as well as translation accesses, non-cacheable accesses, etc. may be communicated to the external interface unit 32. The external interface unit 32 may be configured to transmit transactions to the external cache 34 in response to the various accesses generated in the processor 10. The external interface on which transactions are transmitted may have any form. For example, the external interface may be a shared bus, a point to point interconnect with packetized transactions, a full or partial crossbar, etc.

The external cache 34 may have any capacity and configuration as well. In an embodiment, the external cache 34 may be a level 2 (L2) cache. In another embodiment, the processor 10 may include an L2 cache and the external cache 34 may be a level 3 (L3) cache. The external cache 34 may be any level of cache in a memory hierarchy. The external cache 34 may be inclusive of the data cache 30, non-inclusive of the data cache 30, or exclusive of the data cache 30, in various embodiments. The cache block size in the external cache 34 may be the same size as the cache block size of the data cache 30, or may be a different cache block size (e.g. a larger cache block size).

The request queue (RQ) 36 may be configured to receive requests from the processor 10 (and potentially other processors in a multiprocessor configuration) to access the external cache 34. The requests may be demand fetches, or may be prefetch requests. The prefetch requests from the prefetch circuit 20 that are targeted at the external cache 34 (as opposed to those that target the data cache 30 and miss) may bypass the data cache 30 and may be enqueued by the prefetch circuit 20 in the prefetch queue 38 for transmission to the external cache 34. Prefetch requests that miss in the data cache 30, as well as demand fetch misses in the data cache 30 and/or the instruction cache 14, may be transmitted as requests by the external interface unit 32 to the external cache 32 as well. Each of these requests may be queued in the request queue 36; and the requests may be serviced by the external cache 34 from the request queue 36. If the requests are a miss in the external cache 34, the requests may be transmitted to lower level caches and/or a main memory in a system including the processor 10.

The mux 28 may select among its various inputs (the LSUs 18A-18N, the load queue 22, the store queue 24, and the prefetch queue 26) to transmit cache accesses to the data cache 30. Control logic to the mux 28 (not shown in FIG. 1) may arbitrate among the requests using any desired arbitration scheme. The mux 28 may select multiple inputs to access the data cache 30 (and the prefetch circuit 20) concurrently (e.g. up to one per data cache port). In an embodiment, the data cache 30 may include two read ports and two write ports, for example, supporting up to two load ops (and/or store ops performing a hit check) and two store ops per clock cycle. More or fewer ports may be supported.

It is noted that any number and type of execution units 16A-16N may be included in various embodiments, including embodiments having one execution unit and embodiments having multiple execution units. Any number of LSUs 18A-18N may be included in various embodiments as well, including one LSU and multiple LSUs. Additionally embodiments that include load units (that execute only load ops) and/or store units (that execute only store ops) may be included with or without LSUs.

Prefetch Circuit

Figure 2:
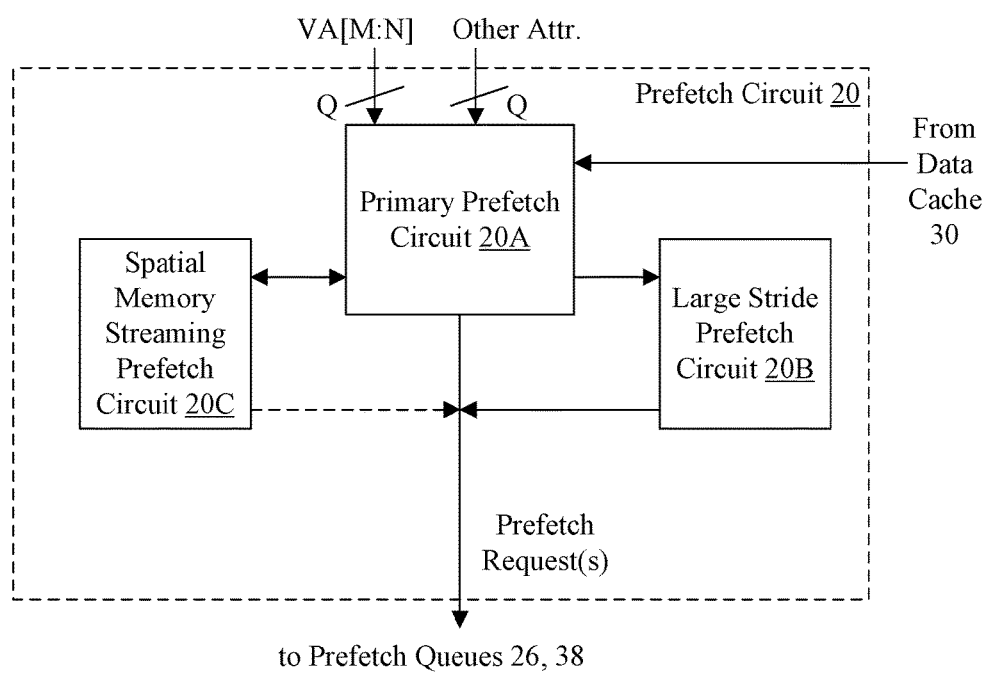
FIG. 2 is a block diagram of one embodiment of a prefetch circuit shown in FIG. 1.

Turning now to FIG. 2, a block diagram of one embodiment of the prefetch circuit 20 is shown. In the illustrated embodiment, the prefetch circuit 20 may include a primary prefetch circuit 20A and one or more secondary prefetch circuits such as the large stride prefetch circuit 20B and/or the spatial memory streaming (SMS) prefetch circuit 20C. The primary prefetch circuit 20A is coupled to the mux 28 to receive data reflecting accesses to the data cache 30 (e.g. up to Q concurrent memory operations from the LSUs 18A-18N, the LQ 22, and the SQ 24) and to the data cache 30. The primary prefetch circuit 20A may be coupled to the secondary prefetch circuits 20B-20C, and may be coupled to the prefetch queues 26 and/or 38 to transmit prefetch requests to the prefetch queues 26/38. The secondary prefetch circuits 20B-20C may be coupled to the prefetch queues 26 and/or 38 as well to transmit prefetch requests, in an embodiment. In one embodiment, the prefetch circuit 20C may or may not generate prefetch requests. For example, the prefetch circuit 20C may provide access maps to the primary prefetch circuit 20A but may not generate prefetch requests of its own accord in an embodiment. In other embodiments, the prefetch circuit 20C may also generate prefetch requests.

The primary prefetch circuit 20A may be the "main" prefetch circuit that may be expected to generate most of the prefetch requests in the processor 10. That is, the prefetch mechanism(s) implemented by the primary prefetch circuit 20A are expected to provide good performance for most workloads executed by the processor 10. The secondary prefetch circuits 20B-20C may be provided to improve the performance of the prefetch circuit 20 overall, for cases that are not as well handled by the primary prefetch circuit 20A. Examples of the primary prefetch circuit 20A and the secondary prefetch circuits 20B-20C are described in more detail below. In general, any prefetch circuits implementing any prefetch mechanisms may be used in various embodiments. The number and types of primary and second prefetch circuits may vary from embodiment to embodiment as well.

AMPM Prefetch Circuit

Figure 3:
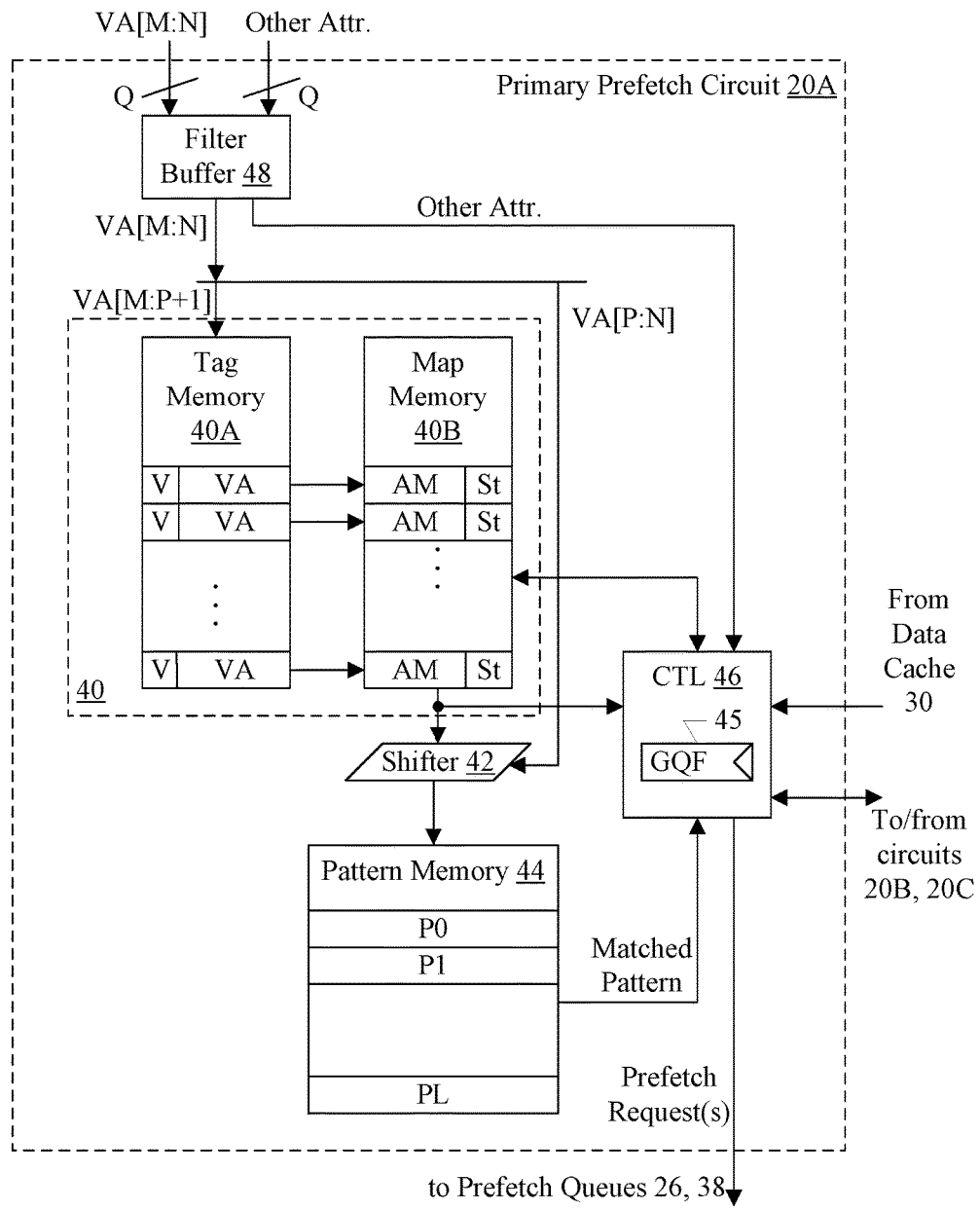
FIG. 3 is a block diagram of one embodiment of a primary prefetch circuit shown in FIG. 2.

Turning now to FIG. 3, a block diagram of one embodiment of the primary prefetch circuit 20A is shown. In the illustrated embodiment, the primary prefetch circuit 20A includes an access map memory 40, a shifter 42, an access pattern memory 44, a control circuit 46, and an input filter buffer 48. The control circuit 46 includes a register 45 storing a global quality factor (GQF).

The filter buffer 48 may receive the Q concurrent memory operations as mentioned above with regard to FIG. 2. Q may be an integer greater than 1 (e.g. 4, in the above example in which the data cache has 4 ports). The filter buffer 48 may capture information from the operations for presentation to the access map memory 40 and the control circuit 46. The filter buffer 48 may be configured to merge multiple memory operations to the same access map and present the operations to the access map memory 40, the shifter 42, and the control circuit 46. In the illustrated embodiment, the filter buffer 48 may be configured to present one operation per clock cycle, although other embodiments may be configured to present more operations in parallel, but less than Q operations. The size and complexity of the memory structures and circuitry in the primary prefetch circuit 20A to support concurrent operations may be reduced through use of the filter buffer 48.

Additionally, in an embodiment, the filter buffer 48 may be an allocation filter for the memory 40. Some access maps may have an initial access, but may not be accessed again until they are evicted from the memory 40. Such maps cause other maps to be evicted when they are allocated, which may remove a map that is causing accurate prefetching to store a map that may not cause any prefetching. The filter buffer 48 may transmit accesses to the map memory 40, and if an access is a miss, may retain the access in the filter buffer 48. If a subsequent access to the same access map as the retained access is detected by the filter buffer 48, the map may be allocated to the memory 40 at that point. In an embodiment, a hysteresis counter may be implemented for each retained access and the number of accesses to occur prior to map allocation may be greater than two. In an embodiment, the number of accesses may be programmable, which may allow for tuning of the amount of filtering.

The filter buffer 48 may capture the virtual address (or a portion thereof) from each memory operation as well as various other attributes that may be used by the primary prefetch circuit 20A. For example, the primary prefetch circuit 20A may receive a physical address to which the virtual address translates. The physical address may actually be received later in time than the virtual address, and may be updated into the access map memory 40. The physical address may be used for prefetches to lower level caches such as the external cache 34, which may be physically addressed. The data cache 30 may be virtually addressed, in some embodiments.

The access map memory 40 and the shifter 42 are coupled to receive the virtual address of an access launched from the filter buffer 48 (or portions of the virtual address, as shown in FIG. 3), and the output of the access map memory 40 is coupled to the shifter 42. The control circuit 46 is coupled to the access map memory 40 and to the access pattern memory 44. The control circuit 46 may be configured to provide prefetch requests to the prefetch queues 26 and 38, and may be configured to receive cache hit/miss information from the data cache 30. The shifter 42 is coupled to the access pattern memory 44. In the illustrated embodiment, the access map memory 40 includes a tag memory 40A and a map memory 40B.

The primary prefetch circuit 20A may be an implementation of an AMPM prefetcher. The access map memory 40 may store multiple access maps covering various access regions in the virtual address space. The access maps may represent the accesses to the cache blocks in the respective access regions. When another access hits on an access map in the access map memory 40, the access map may be output and compared to various access patterns stored in the access pattern memory 44. If a match between a given access pattern and the access map is detected, prefetch requests indicated by the matching pattern may be generated. The access patterns may be determined from trace analysis performed on various code sequences expected to be executed by the processor 10 during use. Given a certain pattern of demand accesses and/or successful prefetches, for example, one or more prefetches may be predicted based on the trace analysis. The access patterns may be identified during design of the processor 10 and hardcoded into the access pattern memory 44. Alternatively, some or all of the access patterns may be programmable in the access pattern memory 44 and may be written to the access pattern memory 44 during initialization of the processor 10 (e.g. at reset) or at some other convenient time.

As mentioned above, the access map 40 may store multiple access maps covering various access regions in the virtual address space. The access region may be a region of the virtual address space that includes multiple contiguous cache blocks. The access region may be aligned to a boundary determined by the size of the access region. For example, if access regions cover 2 kilobytes (kB) each, then the access regions are aligned to 2 kB boundaries. The access regions may be any desired size. For example, 4 kB access regions may be defined. Generally, an access map may be a record of various cache accesses that have occurred to the cache blocks within the access region. Each cache block within the access region may have an associated symbol in the access map, indicating the type of access that has occurred. In one embodiment, accesses may include demand-accessed (symbol A), prefetched to data cache 30 (symbol P), prefetched to lower level cache (L), successful prefetch (symbol S), or invalid (symbol "."). Each symbol may be represented by a different code of a value stored for the cache block in the access map. Thus, three bits per cache block may be stored based on the above symbols. Other embodiments may implement a subset or all of the above symbols along with additional symbols (e.g. symbols for multiple lower level caches, in-progress operations, etc.).

In an embodiment, access maps may have more than one granularity for the symbols in the map. One granularity may be the cache block sized granularity mentioned above. A second granularity may be a multiple cache-block-sized granularity. That is, each symbol at the second granularity may represent multiple adjacent cache blocks. Prefetch requests generated at the second granularity may prefetch the multiple adjacent cache blocks, in an embodiment. By changing granularity, more data may be prefetched more rapidly than at the original granularity. Granularity may be changed, e.g., when an access map reaches a certain length (i.e. number of demand accesses). Such an access map may indicate a high amount of regularity and locality in the region, and thus additional prefetching may be desirable. In an embodiment, there may be more than 2 granularities implemented (e.g. 3 granularities, including cache block sized and 2 different multiples of the cache block size, or even more than three granularities). Some patterns may be fairly regular, but may be noisy when viewed at a fine granularity (smaller granularity sizes). Increasing the granularity may filter the noise, at least somewhat, which may make the regularity of the pattern more visible to the primary prefetch circuit 20A.

A demand-accessed cache block may be a cache block that was accessed without having been prefetched in advance. Thus, a load or store to the cache block may have been executed, and may have missed in the data cache 30. A prefetched (P) cache block may be a cache block that was predicted to be accessed by the primary prefetch circuit 20A, which generated a prefetch request that passed through the prefetch queue 26 and was presented to the data cache 30. Alternatively, the prefetched cache block may have had a prefetch request generated and inserted into the prefetch queue 26, but may or may not have been presented to the data cache 30. A prefetched (L) cache block may be a cache block that was predicted to be accessed by the primary prefetch circuit 20A, which generated a prefetch request to the lower level cache (e.g. external cache 34). The prefetch request for an L symbol may be transmitted to the lower level cache without passing through data cache 30, in an embodiment. In other embodiments, data cache 30 may be checked for a hit for a prefetch request for an L symbol. In either case, the data prefetched from the memory system or a level of cache lower than the external cache 34 may be written to the external cache 34 rather than the data cache 30. A subsequent miss or prefetch to the data cache 30 may result in a hit in the external cache 34. A successfully prefetched cache block may be a cache block that was prefetched (either to the data cache 30 or the external cache 34), and was subsequently demand-accessed (and thus the demand access was a cache hit in the data cache 30 and/or the external cache 34). A successfully prefetched cache block may thus be an accurately prefetched cache block, since it was accessed. An invalid cache block in the access map may be a cache block that has not been accessed.

In an embodiment, there may be "prefetch in progress" symbols for each of the P and L symbols as well, indicating that a prefetch request has been generated but is not yet completed. It is noted that, while different prefetch symbols are provided in the access maps (and pattern maps), other embodiments may support prefetch requests to more than two levels of cache. An additional prefetch symbol may be added for each cache level.

The virtual address (VA) of the data cache access (not including the N least significant bits of the address, bits N−1:0, where $2^N$ is the size of a cache block) may be input to the primary prefetch circuit 20A. The least significant P-N bits of the virtual address provided to the primary prefetch circuit 20A may be an offset within the access map to the cache block being accessed. Thus, the access maps may cover $2^{P+1}$ bytes. The remainder of the virtual address, bits M:P+1, may be a tag that may be compared to the tags in the tag memory 40A.

The tag memory 40A may include multiple entries, each entry storing a tag for a corresponding access map in the map memory 40B. In an embodiment, the access map memory 40 may be fully associative and thus the tag memory 40A may be content addressable memory (CAM). If a match is detected between the VA tag input to the access map memory 40 and an entry in the CAM 40A (and the valid bit is set), a hit is detected on the entry. A corresponding entry in the map memory 40B (e.g. a random access memory, or RAM) may be output by the access map memory 40 to the shifter 42. Each entry in the map memory 40B may include the access map (symbols for each cache block in the access region, labeled AM in FIG. 3) and may optionally include state associated with the access map (labeled St in FIG. 3). Exemplary state for various embodiments will be described in more detail below.

The access patterns in the access pattern memory 44 may be centered on an access point, which may be in approximately the center of the access pattern. That is, the access point may be one position to the right or the left of the exact middle of the access pattern, since the access pattern may be an even number of symbols long and the exact middle is between the two symbols. If the access pattern is an odd number of symbols, the access point may be the center of the pattern. By placing the access point in the center, the patterns may permit both forward and reverse patterns of accesses to be detected. A forward pattern may be progressing at increasingly larger offsets within the access map (viewing the access map offset as a number), whereas a reverse pattern may be progressing at decreasingly smaller offsets. Furthermore, matches to symbols on both sides of the access point may be permitted to capture unusual access patterns.

Based on the access map offset of the input VA, the shifter 42 may shift the access map to align the current access point of the access map to the access point in the pattern memory 44. The shifted access pattern may be provided to the access pattern memory 44, which may compare the shifted access pattern to the patterns. The access pattern memory 44 may thus be a read-only memory (ROM) with comparison circuitry, a CAM, or a combination of ROM and CAM if some access patterns are hardcoded and others are programmable. If a pattern is matched, the matched pattern may be output by the access pattern memory 44 to the control circuit 46. The control circuit 46 may be configured to generate one or more prefetch requests based on the matched pattern and may transmit the prefetch requests to the prefetch queue 26. In the illustrated embodiment, the access pattern memory 44 may include L+1 entries, storing L+1 access patterns labeled P0 to PL in FIG. 3. In an embodiment, the generated prefetch requests may include a pointer indication indicating whether or not pointer read activity in the access map has been observed and should be included in determining prefetches. In an embodiment, the access map and/or the matched pattern may be provided with the prefetch request as well, to the prefetch queues 26 and/or 38.

A given access map may match more than one pattern in the pattern memory 44. Longer patterns (patterns having the most demand-accessed and/or successfully prefetched cache blocks) may be more likely to generate accurate prefetches. In an embodiment, the patterns in the pattern memory 44 may be sorted so that the longer patterns are nearest one end of the memory (e.g. the "top", where pattern P0 is stored, or the "bottom", where pattern PL is stored). The pattern memory 44 may include a priority encoder that selects the match nearest the top, or nearest the bottom, if there is more than one match. In this manner, the longest pattern that is matched may be naturally selected from the pattern memory 44 and provided to the control circuit 46. Other embodiments may not necessarily order the patterns as discussed in this paragraph, but may still output the longest pattern that is matched by the access map.

In addition to generating the prefetch requests, the control circuit 46 may be configured to update the hitting access map in the access map memory 40. The update may, in some cases, be affected by the cache hit/miss result and thus the cache hit/miss from the data cache 30 may be received by the control circuit 46. In the event of a miss on the access map memory 40, the primary prefetch circuit 20A may allocate an access map entry to the virtual address and may begin tracking the access map in the allocated entry.

FIG. 4 illustrates various examples of access patterns that may be represented in the access pattern memory 44 according to one embodiment of the primary prefetch circuit 20A. The access point (AP) is illustrated with a heading of AP and two vertical lines separating the symbol at the access point from the other symbols. The access patterns may use the same set of symbols that are used in access maps, including the ".", P, L, A, and S symbols (although no S symbols are used in the examples of FIG. 4).

The first pattern shown is a simple unit stride pattern as may be detected by a stride based prefetcher. In this case, pattern is forward and thus the A symbols are on the left and the P symbols are on the right. To match this pattern, the three A symbols would need to be matched to the access map. If a match on this pattern is detected, the control circuit 46 may be configured to generate two prefetch requests, one at the access point plus one cache line and one at the access point plus two cache lines. If the access map already included one P, the other prefetch request may be generated. If both Ps were already in the access map, no additional prefetch requests may be generated.

The second pattern shown is a non-unit stride, but still a regular stride, in the forward direction. In this example, the stride is two. If a match on this pattern is detected (by matching the three As and the intervening "." symbols as well), the control circuit 46 may be configured to generate two prefetch requests, one at the access point plus two cache lines and one at the access point plus four cache lines. Like the first pattern, if a given P is already in the access map, the other prefetch request may be generated and no prefetch requests may be generated if both Ps are already in the access map.

The third pattern shown is a unit stride pattern in the backward direction, again two prefetches would be generated if the pattern is matched by the three As, two prefetch requests would be generated (one at the access point minus one cache line, the other at the access point minus two cache lines). Like the first pattern, if a given P is already in the access map, the other prefetch request may be generated and no prefetch requests may be generated if both Ps are already in the access map.

The first three patterns in FIG. 4 illustrate patterns that a stride-based prefetcher may be able to detect. However, the control over the number of prefetches that are generated may be more precise using the patterns. In an embodiment, if there are N matching As and/or Ss in a pattern, there may be N−1 Ps in the pattern. Thus, as the pattern length is longer, the confidence in the pattern to generate accurate prefetches may increase.

In addition, a wildcard symbol may be included in the patterns. For example, the fourth pattern shown may include three wildcard symbols, illustrated as "*" in FIG. 3 (e.g. at reference number 49). The wildcard pattern may match any symbol in an access map. The wildcard patterns may increase the flexibility of the access patterns, in an embodiment. For example, in an out-of-order processor, the demand accesses may occur in a variety of orders based on operand availability, execution resource availability, and other dynamic factors. The varying order of accesses creates "noise" near the access point. Without wildcards, accurately matching such access maps to access patterns may be more complicated. Multiple access patterns might have to be included, to capture all the possible orders, for example, limiting the number of unrelated access patterns that may be included in a given size of memory.

Another case in which wildcard symbols in access patterns may be useful is to capture access maps in which unusual orders of accesses are performed by the code (even if executed approximately in order), even though the final access patterns may be regular (e.g. all the cache blocks in a range of the access map may be touched, or a predictable group may be touched). Wildcard symbols may be used for the unusual ordered accesses in such cases.

As mentioned, a wildcard symbol may match any symbol at the same point in an access map. Accordingly, multiple access maps may match a pattern that includes a wildcard symbol. FIG. 5 is an example of an access pattern with one wildcard symbol, and the six access maps which would match that access pattern.

Another type of pattern that may be used is an irregular pattern. The fifth and sixth patterns illustrated in FIG. 4 are examples of irregular patterns. Generally, an irregular pattern may be any access pattern which is predictable, but is not accurately described with a stride. That is, the actual cache blocks accessed by the instruction code being executed are irregularly spaced, but are still predictable. Access maps with irregular patterns may be detectable in the pattern memory 44, and may be accurately predicted for prefetches. Wildcard patterns may also be used to aid in detecting irregular patterns as well, as mentioned above.

An example in which prefetch symbols for multiple cache levels is shown as well, including Ps for the cache blocks nearest the access point and Ls in subsequent cache blocks. As mentioned previously, there may be more levels of cache to which prefetching is supported, and there may be patterns with prefetch symbols for those additional levels as well.

In some embodiments, one or more default patterns may be supported (referred to as "density patterns"). Density patterns may include one A symbol at the access point, and prefetch symbols. Since the access point is automatically an A, the density patterns match if no other pattern matches. The density patterns may presume the nearby cache blocks are good prefetch candidates, and thus may include prefetch symbols nearby. To avoid potentially polluting the nearest caches to the processor 10, density patterns may include prefetch symbols for the lowest level cache to which prefetch is supported, in an embodiment. For example, the density pattern shown in FIG. 3 includes L prefetch symbols to prefetch to the external cache 34. Backward density patterns may be supported as well in some embodiments. An example forward density pattern is illustrated as reference numeral 47 in FIG. 4.

In an embodiment, an additional symbol may be supported, referred to as an "anti-prefetch" symbol (illustrated as an "N" in FIG. 4, e.g. reference numeral 43). Anti-prefetch symbols may be used to indicate cache blocks for which a prefetch should not be performed. For example, the cache block may be known not to be accessed based on previous history, or may be accessed infrequently enough that prefetching may not be desirable. An N in the access map may override a P in the matching access pattern to prevent a prefetch, in an embodiment. In one embodiment, anti-prefetch symbols may be generated in an access map in the SMS prefetch circuit 20C, based on merging the access maps from multiple evictions from the primary prefetch circuit 20A, as described in more detail below.

In embodiments in which in-progress prefetch symbols are included in the access maps, the in-progress symbols may match corresponding prefetch symbols in the access patterns, so that those prefetches are not generated again.

Figure 6:
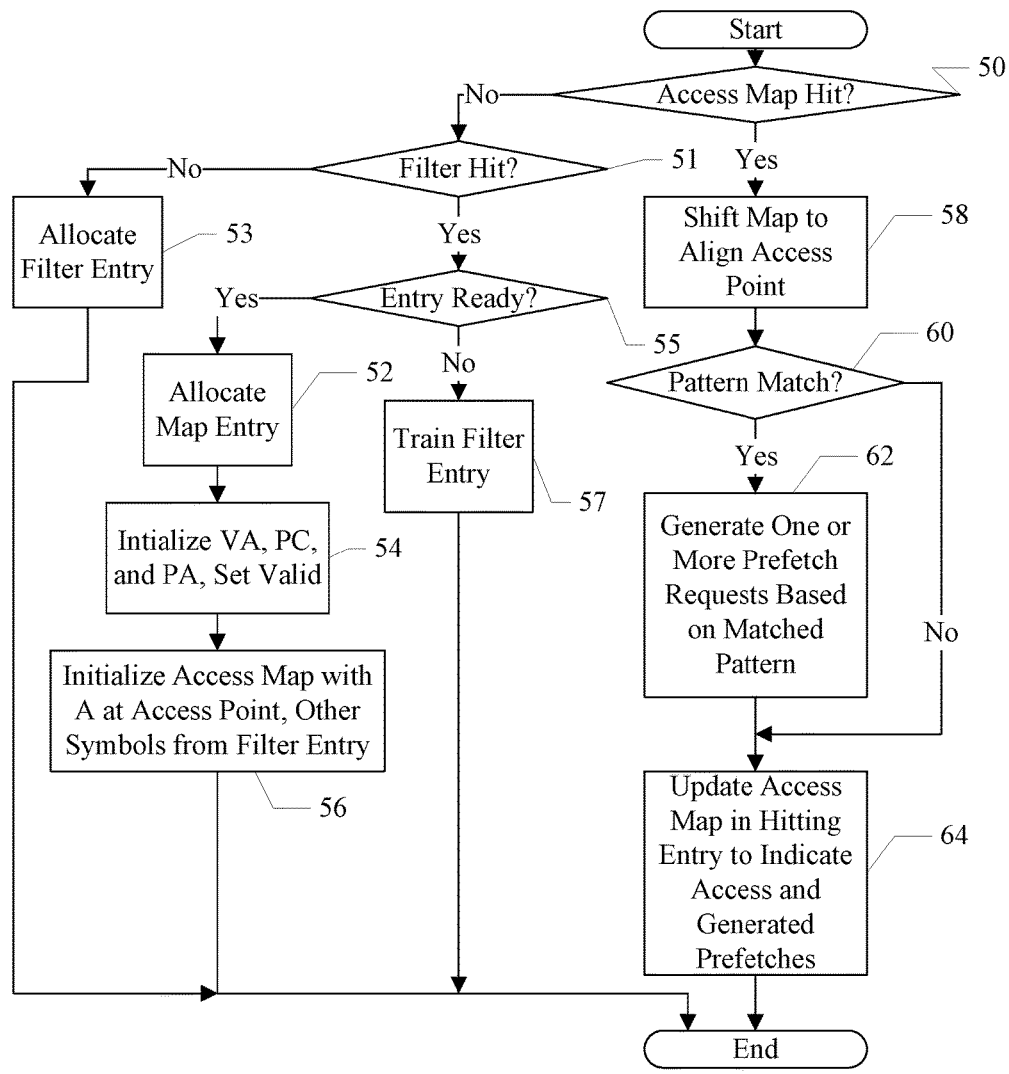
FIG. 6 is a flowchart illustrating operation of one embodiment of the prefetch circuit shown in FIG. 3.

Turning next to FIG. 6, a flowchart is shown illustrating operation of one embodiment of the primary prefetch circuit 20A, and more particularly the control circuit 46, in response to a virtual address received by the primary prefetch circuit 20A (in parallel with the address accessing the data cache 30). While the blocks are shown in a particular order for ease of understanding, other orders may be used. Blocks may be performed in parallel in combinatorial logic in the primary prefetch circuit 20A/control circuit 46. Blocks, combinations of blocks, and/or the flowchart as a whole may be pipelined over multiple clock cycles. The primary prefetch circuit 20A/control circuit 46 may be configured to implement the operation shown in FIG. 6.

The virtual address (or the access map tag portion of the address) may be presented to the access map memory 40. If the virtual address is a miss in the access map memory 40 (decision block 50, "no" leg), the control circuit 46 may check for a hit on an entry in the filter buffer 48 (decision block 51). If the access is also a miss in the filter buffer 48 (decision block 51, "no" leg), the filter buffer 48 may allocate an entry and record the virtual address and other information in the entry (block 53). In an embodiment, the other information may also include the program counter (PC) address of the instruction that caused the demand access. The PC address may be the address at which the instruction itself is stored. The PC address may be captured for embodiments that use the SMS prefetch circuit 20C, for example. Since the access is a miss in both the filter buffer 48 and the access map memory 40, the PC address may be associated with the instruction that initially accesses the map. The filter buffer 48 may initialize an access map in the entry to all invalid except for a demand access at the access point indicated by the address.

If the access is a hit in the filter buffer 48 (decision block 51, "yes" leg), and the filter buffer 48 entry is not ready to be allocated to the memory 40 (decision block 55, "no" leg), the filter buffer 48 may train the entry by recording another demand access in the map in the filter buffer entry (block 57). The filter buffer entry may not be ready, e.g., if the number of demand accesses to the entry has not yet reached the number implemented by the filter buffer (e.g. the hysteresis counter for the entry has not been depleted, for example). Training the entry may also include updating the hysteresis counter.

On the other hand, if the access is a hit in the filter buffer entry (decision block 51, "yes" leg) and the entry is ready (decision block 55, "yes" leg), the control circuit 46 may be configured to allocate an entry in the access map memory 40 for the access region containing the virtual address (block 52). Any sort of allocation scheme may be used. For example, the control circuit 46 may maintain least recently used (LRU) data over the access map entries, and may replace the LRU entry if there are no invalid entries to be allocated. Various pseudo-LRU schemes may be used, or a random replacement may be used. The control circuit 46 may initialize the tag portion of the allocated entry (in the tag CAM 40A) with the virtual address of the access region (e.g. bits M:P+1 of the VA), the PC of the instruction that initially touched the region (captured at the miss in the memory 40 by the filter buffer 48), and the physical address (PA) provided by a translation lookaside buffer (TLB) associated with the data cache. The control circuit 46 may also set the valid bit (block 54). The PA may be provided in a later clock cycle than the VA, in some embodiments. Additionally, the control circuit may initialize the access map portion of the entry (in the map RAM 40B) with a clear access map (e.g. all invalid) except for an A at the access point indicated by the access map offset (bits P:N of the VA) and the other symbols captured by the buffer filter 48 (block 56). The state field associated with the access map may also be initialized, if included. In an embodiment, the memory 40 may be trained with the captured access one access at a time from the filter buffer 48 entry. In this manner, allocation from the filter buffer 48 may appear to be the same as an access to a hitting entry in the memory 40. In another embodiment, the access map from the filter buffer 48 may be provided in one update.

If the virtual address is a hit in the access map memory 40 (decision block 50, "yes" leg), the access map memory 40 may output the corresponding access map to the shifter 42. The shifter 42 may shift the access map to align the access point (the offset to the accessed cache block in the access region—block 58). The shifted pattern output by the shifter 42 may be compared to the access patterns in the access pattern memory 44. If there is a match on a pattern (decision block 60, "yes" leg), the control circuit 46 may be configured to generate one or more prefetch requests based on the Ps and/or Ls in the matched pattern and further based on any previously generated prefetches recorded in the access map (block 62). That is, a previously generated or issued prefetch may not be generated again.

The control circuit 46 may also update the access map in the hitting entry of the access map memory 40, independent of whether the access map matches a pattern in the access pattern memory 44 (block 64). In the present embodiment, the control circuit 46 may update the access map to indicate the current access as well as any generated prefetch requests. If the access map has an invalid symbol (".") at the access point and the access is a demand access, the "A" symbol may be inserted at the access point. If the access map has a prefetch symbol ("P") at the access point and the access is a demand access that hits in the data cache 30, the "S" symbol may be inserted at the access point. If the access map has an invalid symbol (".") at the access point and the access is a prefetch request, the "P" symbol may be inserted at the access point (or the "L" symbol, for prefetch requests to the external cache 34). The generated prefetches may be indicated at their respective points in the access map.

Figure 7:
FIG. 7 is a block diagram illustrating one embodiment of an access map entry.

In some embodiments, the state field in each access map entry may store one or more quality factors. Such an entry 70 is illustrated in FIG. 7, which shows the virtual address tag (VA), the physical address (PA), the PC address of the initial instruction to touch the access map, a valid bit (V), the access map (AM), a pair of quality factors, and a granularity indication (Gran). Other embodiments may not include the granularity indication. A quality factor may be a value that measures or estimates the effectiveness of the prefetching for the corresponding access map. The quality factor may be used to further limit or prevent prefetching (above what the pattern itself already limits) when the effectiveness is not high. Additionally, in some embodiments, the quality factor may be used to "meter" prefetching that is effective but that is being consumed slowly. That is, using the quality factor to limit the prefetching may result in prefetched data being delivered closer to the time at which the data will be consumed by demand fetches. The scheduling of memory accesses in the memory system may be more efficient in some cases, since the prefetch traffic may be less bursty and thus the congestion in the memory system may be lower.

Prefetching may be "effective" if it results in a reduction of average memory latency for memory operations performed by the processor 10, as compared to when no prefetching is performed. The effectiveness may thus take into account both prefetch accuracy (how often a prefetch is consumed by a demand fetch) and any adverse affects that the prefetching may have (e.g. by causing another cache block to be evicted from the data cache 30 or a lower level cache to make room for the prefetched cache block, and the evicted cache block is later accessed by a demand access). In other embodiments, accuracy of the prefetching may be measured by the quality factors.

A pair of quality factors may be used to control prefetch request generation for the data cache 30 and the external cache 34 somewhat independently. The accuracy quality factor (AQF) may control the prefetch generation for the data cache 30 and the bandwidth quality factor (BQF) may control the prefetch generation for the external cache 34. Other embodiments which employ prefetching at more than two levels may employ a quality factor for each level.

Furthermore, the global quality factor may be used to limit the amount of overall prefetching across the access maps in the memory 40. When the global quality factor is low, the primary prefetch circuit 20A may operate in a more efficient mode, generating fewer prefetch requests overall until the global quality factor recovers. The global quality factor may be used because, even though the AQF and BQF may be used to control prefetches from a given entry in the memory 40, there may be many entries and thus a large number of prefetch requests may still be generated at certain times (e.g. early in the execution of a workload, when many new access maps may be allocated). The global quality factor (GQF) may be maintained by the control circuit 46 (e.g. in the register 45 shown in FIG. 3).

As mentioned above, longer access patterns may tend to be more accurate in predicting prefetches, and so the quality factor may not be used if the access map length exceeds a threshold, in some embodiments. In some embodiments, the override of the quality factor may apply only to the AQF/BQF for the entry. That is, the GQF may still prevent the generation of a prefetch request even if the length of the access pattern indicates that the AQF/BQF should be overridden. The threshold may be fixed or programmable in the prefetch circuit, in some embodiments. Different threshold levels may be used for different cache levels (e.g. higher thresholds for lower levels). In another embodiment, access maps longer that a specified length, e.g. the length that overrides the AQF/BQF or a longer length, may override the GQF as well and may be permitted to generate additional prefetch requests.

Figure 8:
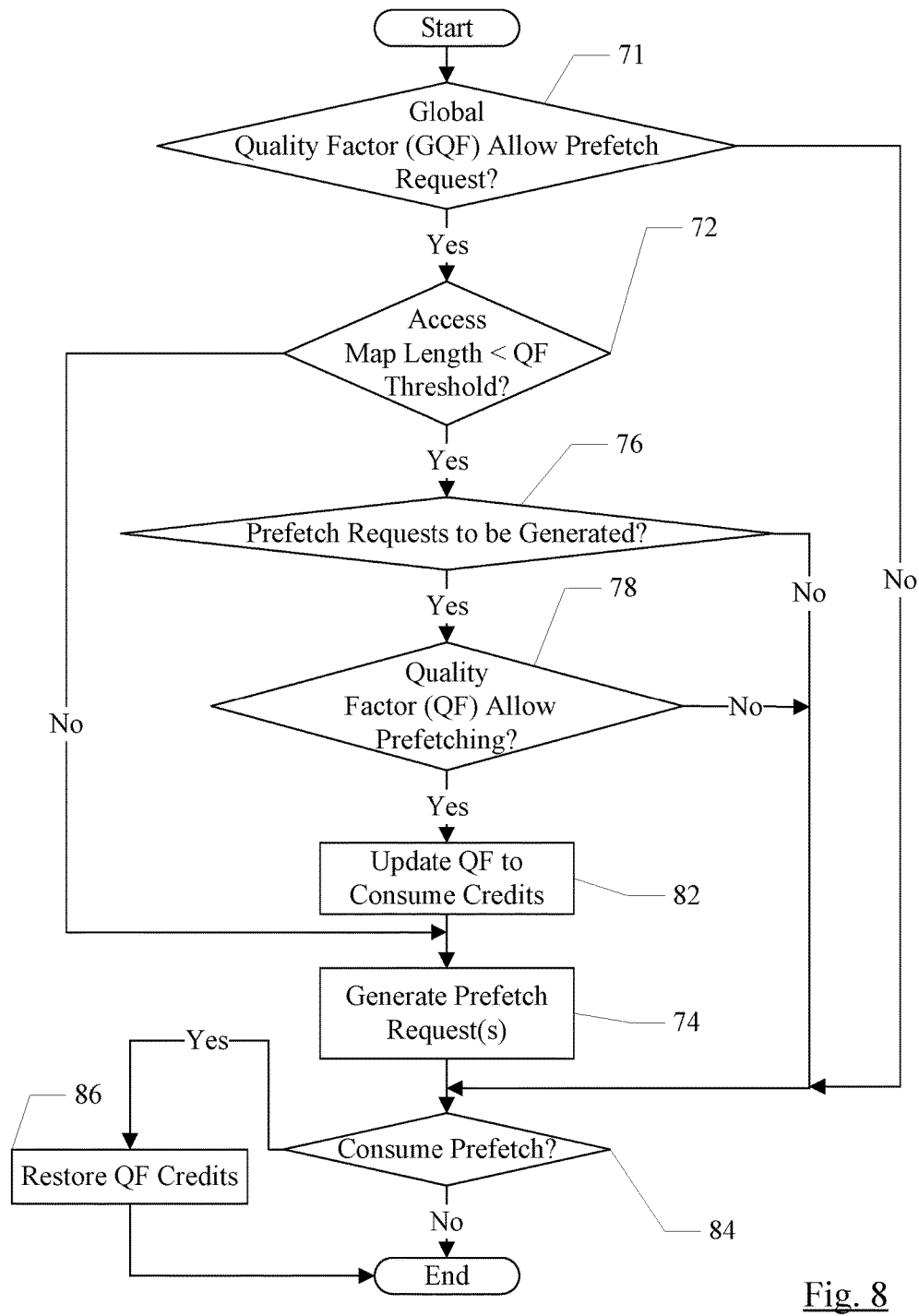
FIG. 8 is a flowchart illustrating operation of one embodiment of the prefetch circuit shown in FIG. 3 for using one or more quality factors to control prefetch request generation.

The GQF may affect the generation of prefetch requests in a variety of fashions. For example, if the GQF is low, the generation of prefetch requests may be directly impacted by the GQF value, as illustrated by FIG. 8 and described in more detail below. In other embodiments, the GQF may impact prefetch request generation less directly. For example, the GQF may be used to determine one of two or more modes for the primary prefetch circuit 20A (or even the prefetch circuit 20 overall). Dependent on the mode, the initialization of AQF/BQF to a newly-allocated access map may differ.

In one embodiment, the GQF may determine one of two modes: efficient mode and performance mode. Other embodiments may implement more than two modes based on various ranges of GQF. If GQF is low (e.g. below a certain predetermined or programmable threshold), the primary prefetch circuit 20A may be in efficient mode. If the GQF is high (e.g. above the threshold), the primary prefetch circuit 20A may be in performance mode. In some embodiments, there may be hysteresis around the threshold to avoid frequent mode changes when the GQF remains near the threshold for a period of time. That is, the GQF may fall below the threshold by a certain amount before switching from performance mode to efficient mode. Similarly, the GQF may rise above the threshold by a certain amount before switching from efficient mode to performance mode.

In the efficient mode, less AQF/BQF may be provided to a newly-allocated access map than in performance mode (e.g. fewer credits, as discussed below). Thus, in efficient mode, fewer prefetch requests may be generated per access map because the AQF/BQF may be consumed and additional prefetch requests may be prevented until the AQF/BQF are restored (e.g. via successful prefetch). In one embodiment, only AQF is allocated on initial map allocation and thus the mode may determine the amount of initial AQF provided to the access map.

Implementing the GQF in the above fashion may permit well-performing access maps that accumulate AQF/BQF through accurate prefetching to continue to generate prefetch requests at higher rates in efficient mode, while newly-allocated maps may be more constrained since they have not been proven to be as accurate as the successful maps with higher AQF/BQF.

In an embodiment, the quality factor may be a token-based or credit-based mechanism. The tokens/credits may represent an allowable amount of outstanding prefetching. Accordingly, tokens/credits may be consumed when a prefetch request is generated (and a prefetch request may only be generated if sufficient tokens/credits are available). A successful prefetch may return tokens/credits to the quality factor value. In an embodiment, a successful prefetch may return more tokens/credits than the generation of a prefetch request consumes, and the passage of time may not return tokens/credits. Alternatively, a more equal return of credits to credits consumed may be used, and the passage of time may also return tokens/credits to the quality factor.

FIG. 8 is a flowchart illustrating operation of one embodiment of the primary prefetch circuit 20A, and more particularly the control circuit 46, in response to a pattern match in the access pattern memory 44 for an access map when quality factors are used. Other operation, e.g. as illustrated in FIG. 6 and discussed above, may also be performed. While the blocks are shown in a particular order for ease of understanding, other orders may be used. Blocks may be performed in parallel in combinatorial logic in the primary prefetch circuit 20A/control circuit 46. Blocks, combinations of blocks, and/or the flowchart as a whole may be pipelined over multiple clock cycles. The primary prefetch circuit 20A/control circuit 46 may be configured to implement the operation shown in FIG. 8.

The description of FIG. 8 below refers to a quality factor. The same set of operations may be performed for each quality factor for which the corresponding access pattern has at least one prefetch request to be generated. Thus, the operation may be performed with the AQF to generate prefetch requests if Ps are in the access map, and the operation may be performed with the BQF to generate prefetch requests if Ls are in the access map. In one embodiment, both AQF and BQF credits may be required to generate external cache prefetch requests (Ls).

As mentioned above, the GQF may control whether or not prefetch requests are generated, in an embodiment. If the GQF is low enough that a prefetch request is not allowed (decision block 71, "no" leg), then the prefetch request may not be generated independent of the pattern match information. In an embodiment, a threshold level may be applied to the GQF to determine if the prefetch request is allowed. The threshold may be programmable or fixed. There may be multiple thresholds as well, with lower thresholds causing increasingly stricter controls on the prefetch generation. A combination of the GQF and the number of pending prefetch requests from the entry may be used. For example, if the GQF is below the threshold, at most one pending prefetch request may be permitted. Thus, if the access map has one or more pending prefetches and the GQF is below the threshold, no prefetch request may be generated from the access map. Other embodiments may permit more or fewer pending prefetch requests per entry, or may vary the number of pending prefetch requests based on the map contents. In embodiments in which the GQF controls the amount of AQF/BQF provided to newly-allocated maps, decision block 71 may not be included.

If the GQF (and potentially other factors, as mentioned above) permits the generation of one or more prefetch requests (decision block 71, "yes" leg), the quality factor for the entry may be considered. If the access map length is greater than or equal to the quality factor threshold (decision block 72, "no" leg), the quality factor is not used for the access map. The prefetch request(s) may be generated as indicated in the access map (block 74). If the access map length is less than the quality factor threshold, but the indicated prefetch requests have already been generated or there are not enough credits/tokens available to generate a prefetch request (decision block 72, "yes" leg and either decision block 76, "no" leg or decision block 78, "no" leg), there is no prefetch request to be generated. If there are prefetch request(s) to be generated and there are sufficient tokens/credits (decision blocks 72, 76, and 78, "yes" legs), the control circuit 46 may be configured to update the quality factor to consume the credits/tokens for a prefetch request or requests (block 82) and may be configured to generate the indicated and permitted prefetch request(s) (block 74). As mentioned previously, L prefetches may consume both AQF and BQF credits. In such embodiments, the primary prefetch circuit 20A/control circuit 46 may check for sufficient AQF and BQF credits for an L prefetch, and may consume both when the L prefetch is generated. GQF credits may also be consumed when a prefetch request is generated.

If an activity occurs that results in a restoration of quality factor credits (e.g. the consumption of a prefetch by a demand access, decision block 84, "yes" leg), the control circuit 46 may restore quality factor credits to the corresponding quality factor(s) (block 86).

The number of credits/tokens consumed for a prefetch request and restored for a successful prefetch may vary in various embodiments. In one example, the AQF may be initialized with a defined number of credits/tokens. A maximum number of tokens may be supported for each quality factor, and the initialization of the AQF may be any amount within the range of 0 and the maximum. For example, about 75% of the maximum may be the initial amount of the AQF. As mentioned above, in an embodiment, the amount of AQF provided may be lower in efficient mode than in performance mode, as indicated by the GQF. In such embodiments, less than 75% of the maximum may be the initial amount of AQF in efficient mode. For example, an embodiment may provide an initial amount of AQF sufficient to generate one prefetch request, or a fixed number of prefetch requests. Other actions and their effects on the AQF, BQF, and GQF are shown in the table of FIG. 9. In the table, a plus sign indicates that the actions increase the corresponding quality factor; a minus sign indicates that the actions decrease the corresponding quality factor; and a zero indicates no change to the corresponding quality factor. In the case of a decrease, if the number of credits/tokens involved in the decrease are not available (e.g. the decrease would reduce the quality factor below zero), then the action may not be taken. In the case of an increase, the number of credits/tokens may be capped at the maximum. The amount of each increase or decrease may vary, or may be the same, in various embodiments.

In the table, a load prefetch is a prefetch request for an expected load operation. Thus, any coherence state which allows the cache block to be read may be used as the memory system's response to the prefetch request. A store prefetch request is a prefetch request for an expected store operation. Thus, the store prefetch request may require a coherence state permitting update of the cache block in the memory system's response to the prefetch request. Data cache prefetches are prefetch requests to the data cache 30 (generated from Ps in the access map). External cache prefetches are prefetch requests to the external cache 34 (generated from Ls in the access map). In general, any set of events may be used to update quality factors corresponding to various levels of cache in a memory hierarchy, in various embodiments.

In an embodiment, the following generalized relationships may be used for the increases and decreases of the AQF and BQF, although other embodiments may use any relationship among the amounts. A data cache load prefetch may be used as the base amount on which the other increases/decreases are specified for this example. The AQF updates will be discussed first in this paragraph, followed by the BQF updates in the next paragraph. The data cache load prefetch may be about 4-6% of the maximum number of credits/tokens. Store data cache store prefetch requests may be about 1.25× to 1.5× the number of tokens/credits consumed for a data cache load prefetch (the "load credits/tokens," for brevity). Consumption of the data cache prefetch by a demand fetch (e.g. the demand fetch hits the prefetched data in the data cache) may be an increase of about 2× the load credits/tokens. Consumption of the data cache prefetch by a demand while the prefetch is still pending may be about 1.5× the load credits/tokens. If a prefetch request hits in the data cache, the prefetch request was not useful and thus may decrease credits/tokens (e.g. about 1.5× the load credits/tokens). Generation of external cache load prefetch requests may be a decrease of about 0.75× to 1.0× the load credits/tokens. External cache store prefetch requests may by about 1.0× to 1.25× the load credits/tokens. Consumption of the external cache prefetch by a demand fetch may be an increase of about 2.5× of the load credits/tokens, whereas consumption of the external cache prefetch by a data cache prefetch may be an increase of about 1.25× to 1.5× the load credits/tokens. Similarly, consumption of the external prefetch, while it is still pending, by a demand fetch may be an increase of about 1.25× to 1.5× the load credits/tokens.

The BQF may be initialized (e.g. to about 64-66% of the maximum credits/tokens) in response to an initial miss in the external cache for a given access pattern. Subsequent misses for the same access pattern may be an increase of about 2.5× the load credits/tokens. The BQF may be decreased in response to the generation of external cache prefetch requests (e.g. generation of external cache load prefetch requests may decrease BQF by about 0.75× to 1.0× the load credits/tokens). External cache store prefetch requests may by about 1.0× to 1.25× the load credits/tokens.

The GQF may not be modified based on map allocation, since the GQF is measured over all access maps. Generation of a prefetch may cause the GQF to be reduced, and consumption of an external cache prefetch by a demand access may cause the GQF to be increased.

As mentioned previously, the above discussion is merely one example of the updates that may be made to the AQF, BQF, and GQF and the events/actions which may cause updates. Other embodiments may vary the events/actions and/or the amount of credit/token update for the events/actions (and the relative amounts of update with respect to each other, as in the above example).

The number of credits/tokens consumed for a prefetch request and restored for a successful prefetch may vary in various embodiments. In one example, the AQF may be initialized to 75 credits/tokens and 100 may be the maximum in each quality factor. Other actions and their affects on the AQF and BQF are shown in the table of FIG. 9. In the table, a load prefetch is a prefetch request for an expected load operation. Thus, any coherence state which allows the cache block to be read may be used as the memory system's response to the prefetch request. A store prefetch request is a prefetch request for an expected store operation. Thus, the store prefetch request may require a coherence state permitting update of the cache block in the memory system's response to the prefetch request. Data cache prefetches are prefetch requests to the data cache 30 (generated from Ps in the access map). External cache prefetches are prefetch requests to the external cache 34 (generated from Ls in the access map). In general, any set of events may be used to update quality factors corresponding to various levels of cache in a memory hierarchy, in various embodiments.

As mentioned above, some embodiments may implement multiple granularities of access maps. For example, the initial granularity of an access map may be the size of a cache block (e.g. 64 bytes, in one embodiment). A larger granularity may be a multiple of the size of a cache block (e.g. twice the size, or 128 bytes, in an embodiment). More particularly, the next larger granularity may be the size of a cache block in a lower level cache such as the external cache 34, when the lower level caches implement larger cache block sizes. Additional larger levels of granularity may be even larger (e.g. 4 times the size of a cache block, 8 times the size of a cache block, etc.). Larger (or coarser) granularity prefetches may allow the prefetch circuit to get farther ahead of the current access point for a given number of prefetches. The larger granularity may also smooth out noisier patterns, since more demand accesses will lie in a given access point.

FIG. 10 is a flowchart illustrating one embodiment of switching granularities for a given access map in the primary prefetch circuit 20A, and more particularly the control circuit 46. Other operation, e.g. as illustrated in FIGS. 6 and/or 8 and discussed above, may also be performed. While the blocks are shown in a particular order for ease of understanding, other orders may be used. Blocks may be performed in parallel in combinatorial logic in the primary prefetch circuit 20A/control circuit 46. Blocks, combinations of blocks, and/or the flowchart as a whole may be pipelined over multiple clock cycles. The primary prefetch circuit 20A/control circuit 46 may be configured to implement the operation shown in FIG. 10. The operation illustrated in FIG. 10 may be implemented to change between any two granularity levels, when more than two granularity levels are implemented. In one embodiment, granularity switch between two adjacent granularity levels (when ordered from finest to coarsest) may be permitted. In other embodiments, granularity levels may be skipped if desired.

During an access map read, the primary prefetch circuit 20A may detect whether or not there is a potential for a granularity switch for the access map (decision block 90). In an embodiment, an access map may be eligible for a granularity switch if the length of the access map (e.g. the number of accesses in the map) exceeds a certain threshold. The threshold may be programmable or fixed, in various embodiments. In one embodiment, the length may be 6, for example. Additional conditions for granularity switch eligibility may exist as well. For example, in an embodiment, the pattern in the access map is required to be a strided pattern with a stride of one (i.e. consecutive cache blocks are being fetched). Furthermore, a granularity switch may not already be pending for the access map. If these conditions are met (decision block 90, "yes" leg) the primary prefetch circuit 20A may be configured to establish a granularity switch pending state for the access map (block 92). The granularity switch pending state may be part of the granularity field (Gran in FIG. 7), or may be an additional state bit in the state field.

If the conditions for initiating a granularity switch are not met (decision block 90, "no" leg), but the granularity switch is pending from a previous access (decision block 94, "yes" leg), the primary prefetch circuit 20A may clear the access map (since it is currently recording accesses at the finer (or smaller) granularity) (block 96). The primary prefetch circuit 20A may reallocate the same access map location in the access map memory 40 with the granularity field indicating the larger (coarser) granularity (block 98). Additionally, since the access map now covers a region that is twice as large, it is possible that there is an overlapping access map (duplicate map). Such maps are invalidated (block 100). If there is no granularity switch pending from a previous access (decision block 94, "no" leg), blocks 96, 98, and 100 may not be performed by the primary prefetch circuit 20A.

Figure 11:
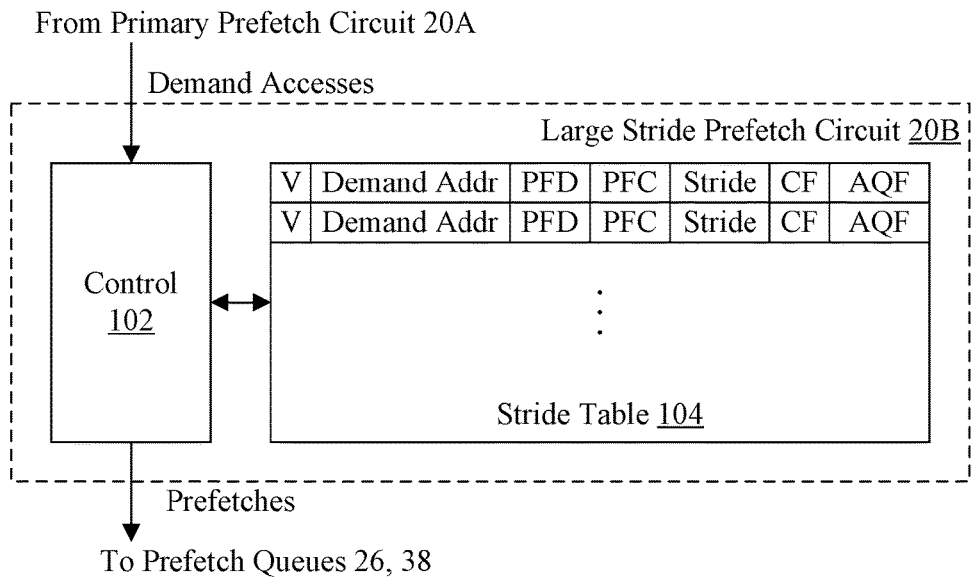
FIG. 11 is a block diagram illustrating one embodiment of a large stride prefetch circuit shown in FIG. 2.

Turning now to FIG. 11, a block diagram of one embodiment of the large stride prefetch circuit 20B is shown. In the illustrated embodiment, the large stride prefetch circuit 20B may include a control circuit 102 and a stride table 104. The control circuit 102 is coupled to the stride table 104, to the primary prefetch circuit 20A, and to the prefetch queues 26 and/or 38 to provide prefetch requests.

The control circuit 102 may receive demand accesses from the primary prefetch circuit 20A and may detect various streams of strided access patterns in the demand accesses. The control circuit 102 may not receive all demand accesses. For example, in an embodiment, the control circuit 102 may receive demand accesses that miss in the primary prefetch circuit 20A (and thus may be the start of a new stream). In an embodiment, the control circuit 102 may also receive demand accesses for access maps that match strided access patterns.

The stride table 104 may have multiple entries to detect various stride streams. Each entry may include a valid bit (V) indicating whether or not the entry is tracking a potential (or confirmed) stream. The demand address field (Demand Addr) may be the most recent demand address that is considered to be part of the stream. The prefetch degree (PFD) may be the degree of the most recently generated prefetch request from the demand address (e.g. the number of strides that the most recently generated prefetch request is ahead of the most recent demand address). The pending prefetch count (PFC) field may be a count of the number of prefetch requests that may be launched but which have not yet been launched. The stride field may store the stride for the entry, and the confidence factor (CF) may store a confidence value in the stride (e.g. a counter that may be incremented each time the stride is confirmed and decremented if the stride appears to change, saturating at maximum and minimum values). An accuracy quality factor (AQF) may be maintained similar to the AQF described above for the primary prefetch circuit 20A as well.

Strided stream detection may be performed by comparing the demand accesses to the streams being tracked in the stride table 104. For example, the address of a demand access can be detected as being part of a confirmed-stride stream (a stream in which the stride has been calculated and at least one additional address matching the stride has been detected), and the demand access may cause the confidence of the stream to be increased (the CF field of the entry may be the confidence counter for the entry). For a stream that had not yet had a stride detected, the most recent demand address may be subtracted from the received demand address to detect a potential stride, which may be written to the stride field of the entry (and the received demand address may be written to the demand address field). If a stride has been previously detected but not confirmed, the calculated stride may be compared to confirm the stride.

The large stride prefetch circuit 20B may detect strides of various sizes, but may not generate prefetch requests for streams that may be handled by the primary prefetch circuit 20A. For example, strides that will permit multiple accesses to be detected by a given access pattern may be handled by the primary prefetch circuit 20A. However, strides that are larger than about ½ of the access map size, for example, may not be handled by the primary prefetch circuit as the next access may not be within the map. In an embodiment, the large stride prefetch circuit 20B may generate prefetch requests for strides that are ½ of the access map size and one or more multiples of 2 of that stride size.

In one embodiment, the control circuit 102 may implement sleep circuitry to save power when the large stride prefetch circuit 20B is not generating prefetch requests, or not generating prefetch requests very often. For example the control circuit 102 may monitor for a continuous time period of no prefetch generation. Alternatively, idle cycles may decrement a counter and prefetch generation may increment a counter. Sleep may occur if the counter reaches zero. The increments and decrements may be of different sizes, in an embodiment. Once sleep has been initiated, a sleep counter may be initialized and the large stride prefetch circuit 20B may sleep for the period indicated by the sleep counter.

Figure 12:
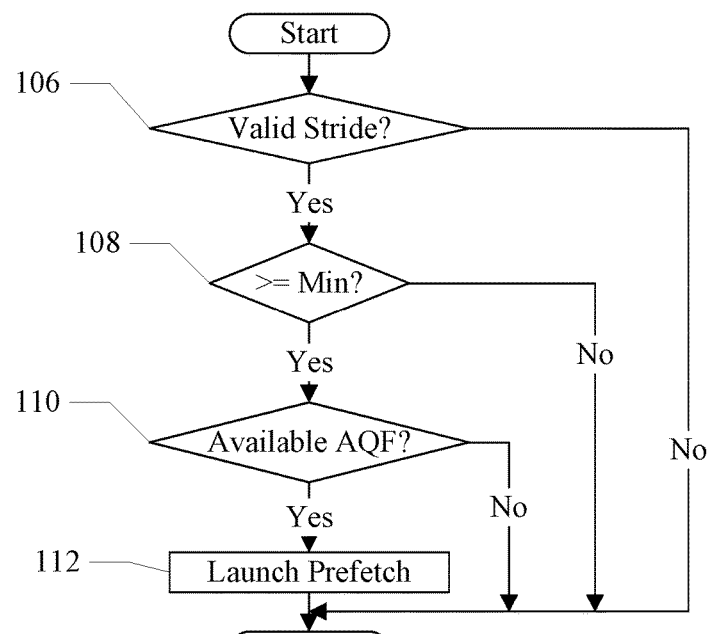
FIG. 12 is a flowchart illustrating generation of a prefetch request from the large stride prefetch circuit for one embodiment.

FIG. 12 is a flowchart illustrating one embodiment of generation of a prefetch request by the large stride prefetch circuit 20B (and more particularly the control circuit 102 in an embodiment). While the blocks are shown in a particular order for ease of understanding, other orders may be used. Blocks may be performed in parallel in combinatorial logic in the large stride prefetch circuit 20B/control circuit 102. Blocks, combinations of blocks, and/or the flowchart as a whole may be pipelined over multiple clock cycles. The large stride prefetch circuit 20B/control circuit 102 may be configured to implement the operation shown in FIG. 12.

The operation in FIG. 12 illustrates the determination of whether or not a given entry in the stride table 104 is ready to launch a prefetch. If multiple entries are ready to launch a prefetch, any mechanism may be used to select among the ready entries (e.g. round robin, least recently used (LRU) entry, random, etc.).

If the entry has a valid stride that is greater than or equal to the minimum stride size that is prefetched by the large stride prefetch circuit 20B and for which there is available AQF credits, the entry may launch a prefetch request (decision blocks 106, 108, and 110, "yes" legs and block 112). Otherwise, the entry may not be ready to launch a prefetch. In some embodiments, other aspects of the entry may affect readiness as well (e.g. sufficient confidence as indicated by the confidence factor CF, pending prefetch count (PFC) and prefetch degree (PFD) values, etc.).

In one embodiment, the primary prefetch circuit 20A and the large stride prefetch circuit 20B may track prefetches launched by the other prefetch circuit 20B/20A and may not launch prefetch requests for prefetches that have already been requested by the other prefetch circuit 20B/20A. Such an embodiment may reduce the launch of redundant prefetches for the same data. Either prefetch circuit 20A-20B may also update information in their prefetch entries based on the prefetch launched by the other prefetch circuit 20B/20A.

In one embodiment, the large stride prefetch circuit 20B may implement a launched prefetch history filter which tracks the last N prefetch requests and prevents launch of redundant prefetches. In another embodiment, the large stride prefetch circuit 20B may track the prefetch requests per prefetch entry in order to reduce redundant prefetches.

Figure 13:
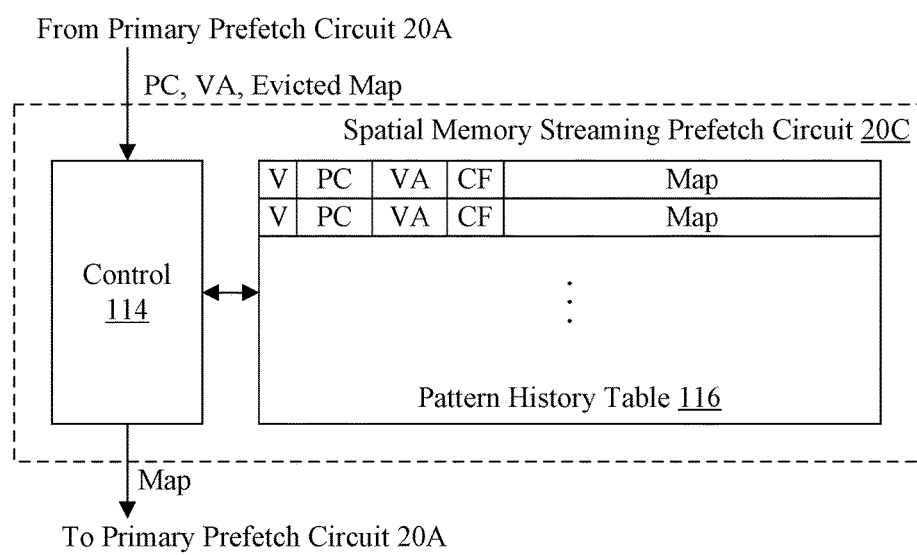
FIG. 13 is a block diagram of one embodiment of the spatial memory streaming prefetch circuit shown in FIG. 2.

FIG. 13 is a block diagram of one embodiment of a spatial memory streaming (SMS) prefetch circuit 20C. In the illustrated embodiment, the SMS prefetch circuit 20C includes a control circuit 114 and a pattern history table 116. The control circuit 114 may be coupled to the primary prefetch circuit 20A and the pattern history table 116.

In the illustrated embodiment, the SMS prefetch circuit 20C may detect SMS streams in evicted access maps from the primary prefetch circuit 20A, merging multiple evicted maps associated with the same program counter (PC) address of the initial instruction to touch the map (causing the map allocation in the primary prefetch circuit 20A, although allocation may be delayed in the filter buffer 48 (FIG. 3) to verify one or more additional accesses to the memory region). The resulting map may be returned to the primary prefetch circuit 20A when the PC address is next encountered and a miss occurs in the map memory 40.

The pattern history table 116 may include multiple entries. Each entry may include a valid bit (V), a PC field for the initial program counter (PC) address, a virtual address field (VA) for the virtual address of the region corresponding to the access map, a confidence factor (CF) indicating how confident the prefetch circuit 20C is in the entry, and an access map field (Map) for the access map.

While the present embodiment returns maps to the primary prefetch circuit 20A when a PC address recurs for a primary prefetch circuit miss, other embodiments may track SMS behavior and may generate prefetch requests based on the observed SMS behavior. In such cases, the control circuit 114 may be coupled to the prefetch queues 26 and/or 38 to transmit prefetch requests.

Figure 14:
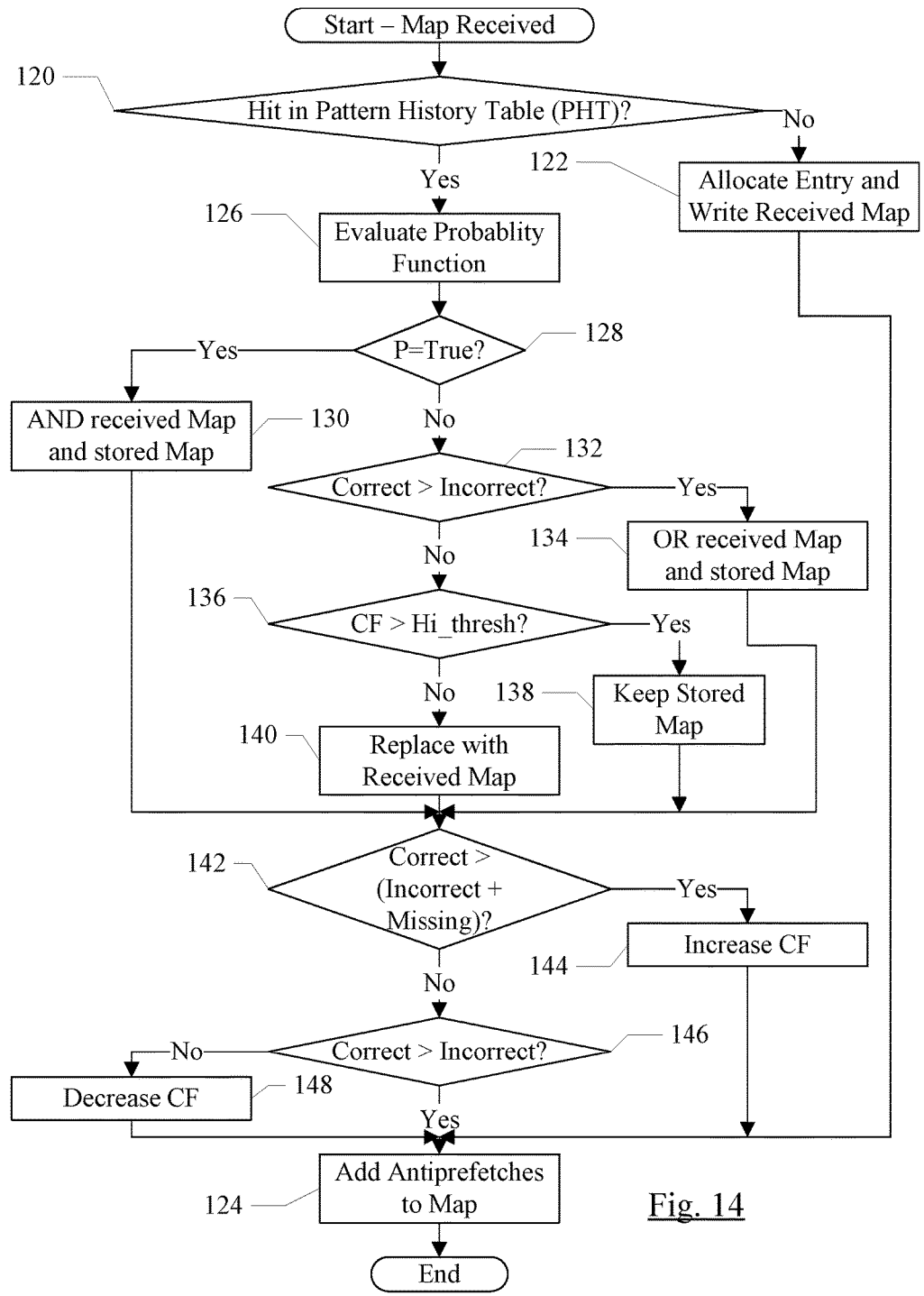
FIG. 14 is a flowchart illustrating operation of one embodiment of the spatial memory streaming prefetch circuit shown in FIG. 13 in response to an evicted map from the primary prefetch circuit.

FIG. 14 is a flowchart illustrating operation of one embodiment of the SMS prefetch circuit 20C (and more particularly the control circuit 114 in an embodiment) in response to receiving an evicted access map from the primary prefetch circuit 20A. The evicted access map may be referred to below as the received access map. While the blocks are shown in a particular order for ease of understanding, other orders may be used. Blocks may be performed in parallel in combinatorial logic in the SMS prefetch circuit 20C/control circuit 114. Blocks, combinations of blocks, and/or the flowchart as a whole may be pipelined over multiple clock cycles. The SMS prefetch circuit 20B/control circuit 114 may be configured to implement the operation shown in FIG. 14.

The SMS prefetch circuit 20C/control circuit 114 may be configured to compare the PC address corresponding to the received map to the corresponding field in the pattern history table (PHT) to determine if there is a hit on an entry (decision block 120). If not (decision block 120, "no" leg), the SMS prefetch circuit 20C/control circuit 114 may be configured to allocate an entry and write the received map and other data to the entry (block 122). In an embodiment, the map may be filtered prior to allocation to eliminate some maps that are unlikely to exhibit SMS behavior or benefit from the SMS prefetch circuit mechanism. For examples, patterns that are full may be streaming patterns and may be handled well by the primary prefetch circuit 20A without operation by SMS prefetch circuit 20C, and thus may be filtered. Patterns that contain only one access (or less than a minimum number of accesses) may be also be filtered. In an embodiment, anti-prefetches may also be added to the map (block 124). In one embodiment, map locations that are not valid (e.g. a "." symbol) may be initialized as anti-prefetches and may be overridden in subsequent updates to the map. In other embodiments, prefetches which were not consumed may be added as anti-prefetches.

If the PC address is a hit in the PHT 116 (decision block 120, "yes" leg), the SMS prefetch circuit 20C/control circuit 114 may update the hitting entry based on the received map. The blocks shown below the decision block 120 illustrate one embodiment for updating the map. In general, the received map may be merged with the map in the hitting entry in some fashion, one embodiment of which is illustrated in FIG. 14 and described in detail below. Other embodiments may implement the merge in other fashions, including subsets of the merge described below and/or other merge mechanisms. It is noted that, while a PC address may be associated with a map, the offset of the initial access in the map (the access associated with the PC address) may be different from map to map. In order to accurately update the map, the map may be rotated by the difference in the offsets (and the offset may be saved in the PHT 116 for each entry). In other embodiments, the offset may be included in the comparison to detect a hit, and the rotation may not be performed.

To prevent the stored map from becoming stale with old map data that is not being repeated, the map may be occasionally ANDed with the received map. The AND may leave a symbol in place if both maps have the same symbol, or may include an invalid symbol (".") if the symbols differ. Alternatively, an anti-prefetch symbol may be included if the symbols differ. In the illustrated embodiment, a probability function may be evaluated to determine whether or not to perform the periodic AND. Other embodiments may implement other mechanisms. The SMS prefetch circuit 20C/control circuit 114 may evaluate the probability function (block 126) and if the probability is true (decision block 128, "yes" leg), the SMS prefetch circuit 20C/control circuit 114 may perform the AND of the received map and the stored map (block 130). If the probability function evaluates to false (decision block 128, "no" leg), the merge may be based on other factors.

In the illustrated embodiment, another test for the merge may be based on the number of correct symbols in the stored map (as compared to the received map) and the number of incorrect symbols in the stored map (decision block 132). An incorrect symbol may be a symbol in the stored pattern that is not present in the received pattern (not including invalid symbols). A missing symbol may be a symbol that is present in the received pattern but not present in the stored pattern (again, not including invalid symbols). A correct symbol may be a symbol that matches between the patterns. If the number of correct symbols is greater than the number of incorrect symbols (decision block 132, "yes" leg), SMS prefetch circuit 20C/control circuit 114 may logically OR the maps (block 134). That is, a symbol from either pattern may replace an invalid symbol (or an anti-prefetch symbol). On the other hand, if the number of correct symbols is less than or equal to the number of incorrect symbols (decision block 132, "no" leg), the confidence factor for the PHT entry may determine the update. If the confidence factor is above a predetermined threshold (fixed or programmable, shown as Hi thresh in FIG. 14), which may indicate that the stored map appears to be accurate over time (decision block 136, "yes" leg), the SMS prefetch circuit 20C/control circuit 114 may keep the stored map in the entry (i.e. not modified with data from the received map) (block 138). If the confidence factor is not higher than the Hi thresh threshold (decision block 136, "no" leg), the SMS prefetch circuit 20C/control circuit 114 may replace the stored map in the entry with the received map (block 140).

The number of correct, incorrect, and missing symbols may also be used to update the confidence factor in the entry. If the number of correct symbols is greater than the sum of the number of incorrect symbols and the number of missing symbols (decision block 142, "yes" leg), the SMS prefetch circuit 20C/control circuit 114 may increase the confidence factor (block 144). For example, the confidence factor may be incremented. Alternatively (decision block 142, "no" leg), if the number of correct symbols is not greater than the number of incorrect symbols (decision block 146, "no" leg), the SMS prefetch circuit 20C/control circuit 114 may decrease the confidence factor (block 148). For example, the confidence factor may be decremented. Otherwise (decision block 142, "no" leg and decision block 146, "yes" leg), the confidence factor may not be modified. The SMS prefetch circuit 20C/control circuit 114 may also update the map with anti-prefetches, in an embodiment (e.g. incorrect symbols may be converted to anti-prefetches—block 124).

In an embodiment, the SMS prefetch circuit 20C may be a source of pre-populated access maps for the primary prefetch circuit 20A. When a map is supplied, the primary prefetch circuit 20A may initiate prefetch requests based on the supplied map and may update the access map memory 40 with the map. In an embodiment, the primary prefetch circuit 20A may check for a hit for a given PC address when the PC address (and associated VA) is a miss in the access map memory 40, for example.

Figure 15:
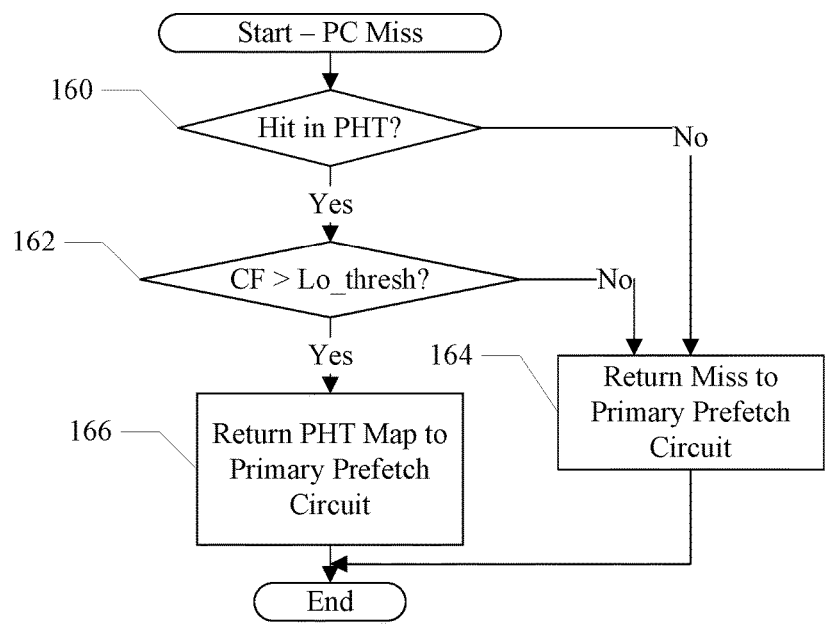
FIG. 15 is a flowchart illustrating operation of one embodiment of the spatial memory streaming prefetch circuit shown in FIG. 13 in response to a program counter (PC) address related to a map miss from the primary prefetch circuit.

FIG. 15 is a flowchart illustrating operation of one embodiment of the SMS prefetch circuit 20C/control circuit 114 in response to a PC address miss from the primary prefetch circuit 20A. While the blocks are shown in a particular order for ease of understanding, other orders may be used. Blocks may be performed in parallel in combinatorial logic in the SMS prefetch circuit 20C/control circuit 114. Blocks, combinations of blocks, and/or the flowchart as a whole may be pipelined over multiple clock cycles. The SMS prefetch circuit 20C/control circuit 114 may be configured to implement the operation shown in FIG. 15.

If the PC address is a miss in the PHT 116 (decision block 160, "no" leg) or the PC address is a hit in the PHT 116 (decision block 160, "yes" leg) but the confidence factor in the entry is not above a predetermined threshold (fixed or programmable, shown as Lo_thresh in FIG. 15) (decision block 162, "no" leg), the SMS prefetch circuit 20C/control circuit 114 may return a miss indication indicating that no map is being provided in response to the PC address (block 164). If the PC address is a hit in the PHT 116 (decision block 160, "yes" leg) and the confidence factor in the entry is greater than the Lo_thresh (decision block 162, "yes" leg), the SMS prefetch circuit 20C/control circuit 114 may return the map from the hitting PHT entry to the primary prefetch circuit 20A (block 166).

Various embodiments may implement any probability functions, threshold values, etc. with regard to the above description. For example, a probability function of true with one eighth probability may be used. The Hi_thresh may be 2 and the Lo_thresh may be 0, with a maximum confidence factor of 5 and a minimum confidence factor of −2. The increment and decrement of the confidence factor may be one.

System

Figure 16:
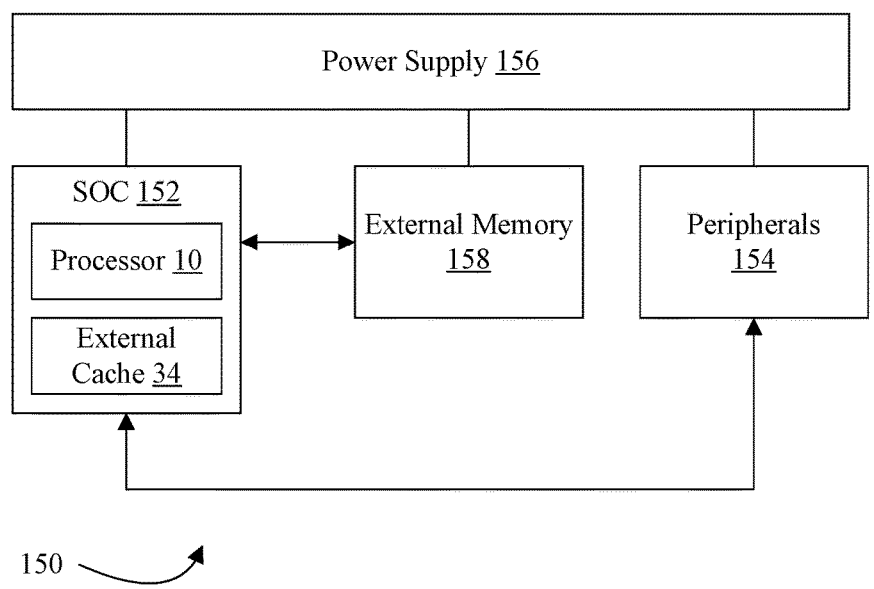
FIG. 16 is a block diagram illustrating one embodiment of a system.

Turning next to FIG. 16, a block diagram of one embodiment of a system 150 is shown. In the illustrated embodiment, the system 150 includes at least one instance of a system on a chip (SOC) 152 coupled to one or more peripherals 154 and an external memory 158. A power supply 156 is provided which supplies the supply voltages to the SOC 152 as well as one or more supply voltages to the memory 158 and/or the peripherals 154. In some embodiments, more than one instance of the SOC 152 may be included (and more than one memory 158 may be included as well). The SOC 152 may include one or more instances of the processor 10 and external cache 34 as illustrated in FIG. 1.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, BLUETOOTH™, cellular, global positioning system (GPS), etc. The peripherals 154 may also include additional storage, including RAM storage, solid state storage, or disk storage. The peripherals 154 may include user interface devices such as a display screen, including touch display screens or multi-touch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAIVIBUS DRAM, low power versions of the DDR DRAM (e.g. LPDDR, mobile DDR (mDDR), etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the SOC 152 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. A prefetch circuit comprising:
    a memory configured to store: a plurality of addresses corresponding to potential prefetch requests and a plurality of first values, wherein each address of the plurality of addresses is associated with at least one first value of the plurality of first values and the at least one first value indicates a first accuracy of prefetches performed with respect to the associated address, wherein the memory is further configured to store a plurality of access maps corresponding to the plurality of addresses, wherein each access map of the plurality of access maps records accesses to a plurality of cache blocks within a defined region associated with a corresponding address of the plurality of addresses, wherein the memory is configured to output a given access map of the plurality of access maps responsive to an access to a data cache at an access address within the defined region associated with one of the plurality of addresses; and
    a control circuit configured to maintain a second value that applies across the plurality of addresses, wherein the second value indicates a second accuracy of prefetches measured across the plurality of addresses, and wherein the control circuit is configured to control whether or not a given prefetch request for a given address is issued based on the at least one first value associated with the given address and further based on the second value, and wherein, when a first address of the plurality of addresses is initially stored in the memory, the at least one first value associated with the first address is initialized to one of a plurality of initial values based on the second value.

2. The prefetch circuit as recited in claim 1, wherein the control circuit is configured to update the at least one value associated with the given address and the second value responsive to generating the given prefetch request.

3. The prefetch circuit as recited in claim 1, wherein the control circuit is configured to compare the given access map to a plurality of access patterns, wherein a first access pattern matched by the given access map specifies one or more prefetch requests to be initiated in response to matching the first access pattern.

4. The prefetch circuit as recited in claim 1, further comprising a filter circuit coupled to an input to the prefetch circuit, wherein the filter circuit is configured to accumulate at least two accesses to a first defined region associated with a first address prior to allocating a first access map in the memory for the first address.

5. The prefetch circuit as recited in claim 4, wherein the filter circuit includes a counter configured to count up to a programmable number of accesses prior to allocating the first access map.

6. The prefetch circuit as recited in claim 4, wherein the filter circuit is configured to train the first access map in the memory with the at least two accesses accumulated by the filter circuit for the first defined region.

7. The prefetch circuit as recited in claim 1, further comprising:
    a second memory configured to store a second plurality of access maps and a corresponding plurality of program counter addresses (PCs) of a plurality of instructions, wherein a given PC of the plurality of PCs identifies an initial instruction that access a given second access map of the plurality of access maps; and
    a second control circuit coupled to the second memory, wherein the second control circuit is coupled to the control circuit and is configured to receive a first access map evicted from the memory and a first PC of the initial instruction that accessed the first access map, wherein the second control circuit is configured to detect that the first access map is a hit on the given second access map and is configured to merge the first access map into the given second access map.

8. The prefetch circuit as recited in claim 7, wherein the merge is a function of a confidence factor associated with the given second access map, a number of correct prefetches in the given second access map as compared to the first access map, and a number of incorrect prefetches in the given second access map as compared to the first access map.

9. The prefetch circuit as recited in claim 7, wherein the given second access map includes one or more symbols identifying locations within the given second access map that are not to be prefetched.

10. The prefetch circuit as recited in claim 7, wherein the second control circuit is configured to return the given second access map to the control circuit responsive to a hit of a second PC from the control circuit, wherein the second PC corresponds to an access that misses the plurality of access maps in the memory.

11. The prefetch circuit as recited in claim 1, further comprising a stride-based prefetch circuit coupled to the control circuit, wherein the stride-based prefetch circuit is configured to detect strided prefetch patterns in accesses that miss in the memory, and wherein the stride-based prefetch circuit is configured to initiate one or more prefetch requests for a strided prefetch pattern that includes a stride which is greater than a predefined size, wherein the stride-based prefetch circuit is configured to detect strided prefetched patterns having strides that are less than the predefined size.

12. The prefetch circuit as recited in claim 11, wherein the predefined size is based on a maximum stride that the plurality of access maps are capable of prefetching.

13. The prefetch circuit as recited in claim 3, wherein a pattern length of the first access pattern is based on a number of demand accesses that have been matched, and wherein the control circuit is configured to change a granularity of the given access map responsive to the pattern length exceeding a threshold amount, and wherein the granularity is one of at least three granularities implemented by the prefetch circuit.

14. A processor comprising:
a data cache;
a first prefetch circuit coupled to the data cache, wherein the first prefetch circuit is configured to:
generate prefetch requests to prefetch data into the data cache based on a plurality of access maps maintained by the first prefetch circuit matching one or more of a plurality of patterns;
control prefetch request generation responsive to a plurality of values that correspond to respective access maps of the plurality of access maps and indicate a first accuracy of prefetches generated from the respective access maps;
further control prefetch request generate responsive to a second value that applies across the plurality of access maps, wherein the second value indicates a second accuracy of prefetches measured across the plurality of access maps; and
when a first access map of the plurality of access maps is initially stored in the memory, initialize at least one first value of the plurality of values corresponding to the first access map to one of a plurality of initial values, wherein the one of the plurality of initial values is selected based on the second value.

15. The processor as recited in claim 14, further comprising a stride-based prefetch circuit configured to detect strides in accesses that miss in the plurality of access maps, and wherein the stride-based prefetch circuit is configured to generate prefetch requests responsive to a first stride-based pattern having a stride greater than a predefined size, and wherein the stride-base prefetch circuit is configured to detect a second stride-based pattern having a stride less than the predefined size.

16. The processor as recited in claim 14, further comprising a second prefetch circuit configured to capture access maps evicted by the prefetch circuit and configured to merge access maps corresponding to a same program counter access (PC) of an initial instruction to access the access maps.

17. The processor as recited in claim 16, wherein the merged access map includes at least one indication of a prefetch request that is not to be generated.

18. A method comprising:
tracking a first effectiveness of prefetching from individual access maps of a plurality of access maps in a prefetch circuit using a first value corresponding to a respective each individual access map;
tracking a second overall effectiveness of prefetching across the plurality of access maps using a second value;
controlling generation of prefetch requests by the prefetch circuit responsive to both the first value and the second value;
initializing a first access map of the plurality of access maps in the prefetch circuit; and
initializing the first value corresponding to the first access map to one of a plurality of values, wherein the one of the plurality of values is selected based on the second value.

* * * * *